(12) United States Patent
Griep et al.

(10) Patent No.: US 7,938,600 B1
(45) Date of Patent: May 10, 2011

(54) CUTTING TOOL AND METHOD OF OPERATING THE SAME

(75) Inventors: David B. Griep, Rubicon, WI (US);
Jeffrey C. Hessenberger, Neosho, WI (US); Edward D. Wilbert, Hubertus, WI (US); Robert W. Butzen, Colgate, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 946 days.

(21) Appl. No.: 11/760,541

(22) Filed: Jun. 8, 2007

Related U.S. Application Data

(60) Provisional application No. 60/811,903, filed on Jun. 8, 2006, provisional application No. 60/833,034, filed on Jul. 25, 2006, provisional application No. 60/857,568, filed on Nov. 8, 2006.

(51) Int. Cl.
*B23B 51/04* (2006.01)

(52) U.S. Cl. ............... 408/1 R; 408/204; 408/239 R

(58) Field of Classification Search .......... 408/142, 408/148, 204–209, 238, 239 R, 239 A, 67–68, 408/1 R; 470/207
See application file for complete search history.

(56) References Cited

U.S. PATENT DOCUMENTS

| | | | | |
|---|---|---|---|---|
| 160,362 A | * | 3/1875 | Stetson | 408/180 |
| 178,270 A | * | 6/1876 | Carpenter | 408/239 R |
| 274,420 A | * | 3/1883 | Vincent et al. | 408/184 |
| 318,986 A | * | 6/1885 | Hicks | 279/54 |
| 914,199 A | * | 3/1909 | Stiren | 7/138 |
| 1,281,627 A | * | 10/1918 | Misener et al. | 408/206 |
| 2,349,400 A | * | 5/1944 | Beckwith | 408/206 |
| 2,700,166 A | * | 1/1955 | McKenzie | 470/209 |
| 2,779,361 A | * | 1/1957 | McKiff | 408/204 |
| 2,803,153 A | * | 8/1957 | Golbeck | 408/174 |
| 3,162,067 A | * | 12/1964 | Koons et al. | 408/206 |
| 3,262,474 A | * | 7/1966 | Enders | 408/209 |
| 3,709,627 A | * | 1/1973 | Elliott, Jr. | 408/204 |
| 3,771,895 A | * | 11/1973 | Meyer | 408/174 |

(Continued)

FOREIGN PATENT DOCUMENTS
DE    2535112 A1 * 2/1977
(Continued)

OTHER PUBLICATIONS

Toolbank, Boa Tungsten Carbide Holesaw Kit (6pce), available online at: <http://www.tools247.co.uk/Uncategorised-B-6922/Boa-Tungsten-Carbide-Holesaw-Kit-6pce.html?keyword=boa+holesaw>, at least as early as Jan. 14, 2010.

(Continued)

*Primary Examiner* — Daniel W Howell
(74) *Attorney, Agent, or Firm* — Michael Best & Friedrich LLP

(57) ABSTRACT

A cutting tool includes a cutting body and a connecting structure configured to support the cutting body. The cutting body can include teeth positioned circumferentially around and extending outwardly from the cutting body. The connecting structure can include a drive shaft for drivingly connecting the cutting tool to a power tool. The connecting structure can also include a connecting plate and a locking member for securing the cutting body to the connecting structure. In some embodiments, the locking member is movable relative to the drive shaft between a locked position, in which the locking member secures the cutting body to the connecting structure, and an unlocked position, in which the cutting body is removable from the connecting structure.

18 Claims, 18 Drawing Sheets

U.S. PATENT DOCUMENTS

| | | | | |
|---|---|---|---|---|
| 3,973,862 | A * | 8/1976 | Segal | 408/204 |
| 4,072,441 | A * | 2/1978 | LaPointe | 408/204 |
| 5,226,762 | A * | 7/1993 | Ecker | 408/204 |
| 5,288,181 | A * | 2/1994 | Pinkston | 408/1 R |
| 6,357,973 | B2 | 3/2002 | Chao | |
| 6,705,807 | B1 | 3/2004 | Rudolph et al. | |
| 6,887,018 | B2 | 5/2005 | Ostermeier | |
| 7,097,397 | B2 * | 8/2006 | Keightley | 408/204 |
| 7,101,124 | B2 * | 9/2006 | Keightley | 408/204 |
| 7,134,815 | B2 * | 11/2006 | Steer | 408/204 |
| 7,517,179 | B2 | 4/2009 | Miller et al. | |
| 2004/0247405 | A1 * | 12/2004 | Keightley | 408/204 |
| 2005/0260048 | A1 * | 11/2005 | Agehara et al. | 408/204 |

FOREIGN PATENT DOCUMENTS

| | | | |
|---|---|---|---|
| FR | 2704790 A1 * | 11/1994 | |
| GB | 2324486 A * | 10/1998 | |
| JP | 57189709 A * | 11/1982 | |
| JP | 07251311 A * | 3/1995 | |
| JP | 08108307 A * | 4/1996 | |
| JP | 10029109 A * | 2/1998 | |

OTHER PUBLICATIONS

Milwaukee Electric Tool Corporation, Power Tools—Hole Saw Accessories, Large Quick Change Arbor, 7/16 in. 49-56-7240 available online at: <http://www.milwaukeetool.com/accessories/drilling-accessories/hole-saws/hole-saw-accessories/large-quick-change-arbor-7-16-in-/49-56-7240>, at least as early as Jan. 14, 2010.

Milwaukee Electric Tool Corporation, Power Tools—Hole Saw Accessories, Large Quick Change Arbor, 3/8 in. 49-56-7250 available online at: <http://www.milwaukeetool.com/accessories/drilling-accessories/hole-saws/hole-saw-accessories/large-quick-change-arbor-3-8-in-/49-56-7250>, at least as early as Jan. 14, 2010.

Milwaukee Electric Tool Corporation, Power Tools—Hole Saw Accessories, Large Quick Change Arbor, 7/16 in. 49-56-7055 available online at: <http://www.milwaukeetool.com/accessories/drilling-accessories/hole-saws/hole-saw-accessories/large-quick-change-arbor-7-16-in-/49-56-7055>, at least as early as Jan. 14, 2010.

* cited by examiner

CUTTING TOOL AND METHOD OF OPERATING THE SAME

RELATED APPLICATIONS

This patent application claims the benefit of prior filed U.S. Provisional Patent Application No. 60/811,903 filed Jun. 8, 2006, U.S. Provisional Patent Application No. 60/833,034, filed Jul. 25, 2006, and U.S. Provisional Patent Application No. 60/857,568, filed Nov. 8, 2006, the entire contents of which are hereby incorporated by reference.

FIELD OF THE INVENTION

The present invention relates to cutting tools and, more particularly, to a rotary cutting tool for a power tool.

SUMMARY

In some embodiments, the invention provides a cutting tool including a cutting body and a connecting structure configured to support the cutting body. The cutting body can include teeth positioned circumferentially around and extending outwardly from the cutting body. The connecting structure can include a drive shaft for drivingly connecting the cutting tool to a power tool. The connecting structure can also include a connecting plate and a locking member for securing the cutting body to the connecting structure. In some embodiments, the locking member is movable relative to the drive shaft between a locked position, in which the locking member secures the cutting body to the connecting structure, and an unlocked position, in which the cutting body is removable from the connecting structure.

In one embodiment, the invention provides a cutting tool including a cutting body having a generally cylindrical side wall defining a cutting axis, a connecting structure configured to support the cutting body and a locking arrangement for selectively coupling the cutting body to the connecting structure. The locking arrangement can include locking protrusions extending from one of the cutting body and the connecting structure in a direction generally parallel to the cutting axis for selectively engaging correspondingly shaped slots on the other of the cutting body and the connecting structure.

In another embodiment, the invention provides a cutting tool including a connecting structure, a sleeve supported on an end of the connecting structure and a first and a second cutting body supported on an end of the sleeve opposite the connecting structure. The first and second cutting bodies define a cutting axis and are movably coupled to the sleeve so as to be maintained in a first orientation or a second orientation. In the first orientation, ends of the first cutting body are engaged with ends of the second cutting body. In the second orientation, the ends of the first cutting body are spaced apart from the ends of the second cutting body.

The present invention also provides a method of operating a cutting tool, including the acts of providing a cutting tool having a first cutting body and a connecting structure configured to support the first cutting body, removably securing the cutting body to the connecting structure, and cutting a workpiece with the cutting body. The method can also include the act of securing a second cutting body of a different size than the first cutting body to the connecting structure.

Other aspects of the invention will become apparent by consideration of the detailed description and accompanying drawings.

DETAILED DESCRIPTION

Figure 1:
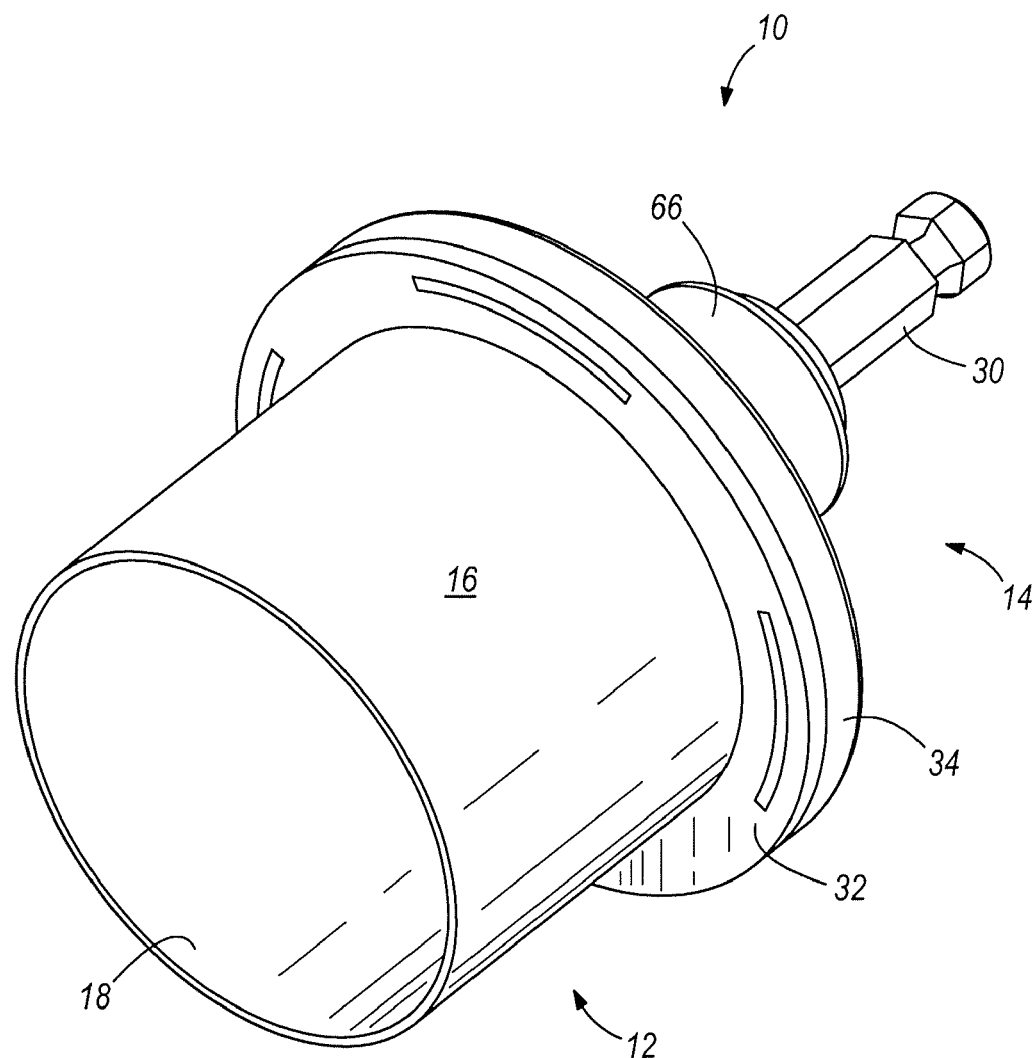
FIG. 1 is a front perspective view of a cutting tool according to some embodiments of the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," and "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In addition, it is to be understood that phraseology and terminology used herein with reference to device or element orientation (such as, for example, terms like "front," "rear," "top," "bottom," "lower", "up," "down," etc.) are only used to simplify description of the present invention, and do not alone indicate or imply that the device or element referred to must have a particular orientation. The elements of the present invention can be installed and operated in any orientation desired. In addition, terms such as "first", "second," and "third" are used herein for purposes of description and are not intended to indicate or imply relative importance or significance.

FIGS. 1-9 illustrate a cutting tool 10, such as, for example, a hole-saw, for operation with a power tool (e.g., a drill, a driver-drill, a screwdriver, and the like). In some embodiments, the cutting tool 10 is operable to cut holes of different sizes in a workpiece and/or to remove plugs from the workpiece.

As shown in FIGS. 1-9, the cutting tool 10 includes a cutting body 12 and a connecting structure 14. The cutting body 12 can include a generally cylindrically-shaped side wall 16 defining a cutting axis 17, a first or workpiece-engaging end 18, and a second or rearward end 20. The first end 18 can include a number of outwardly-extending cutting teeth (not shown) arranged in numerous configurations. The teeth can be large, small, or varied in size around the first end 18, and can also be coarse, fine, or a combination of both, depending on the material to be cut. In other embodiments, the first end 18 can also or alternatively include an abrasive material suitable for cutting, grinding, and/or polishing a workpiece. In still other embodiments, the first end 18 can also or alternatively include outwardly-extending bristles (e.g., wire bristles) suitable for cutting, grinding, and/or polishing a workpiece.

The cutting tool 10 can also include a locking arrangement 21 for selectively securing a cutting body 12 to the connecting structure 14. In the illustrated embodiment of FIGS. 1-9, the locking arrangement 21 includes locking protrusions 22 extending rearwardly from the second end 20 of the cutting body 12 in a direction generally parallel to the cutting axis 17 for selectively engaging correspondingly shaped slots 52 arranged circumferentially around the connecting plate 32 of the connecting structure 14.

In other embodiments, the locking arrangement 21 can also or alternatively include slots 52 arranged circumferentially around the second end 20 of the cutting body 12 and the connecting structure 14 can include one or more outwardly-extending locking protrusions 22 for selectively lockingly engaging the slots 52 in the cutting body 12 to secure the cutting body 12 to the connecting structure 14. In other embodiments, the locking arrangement 21 can also or alternatively include other interengaging elements, including threaded fasteners. In still other embodiments, the cutting body 12 can be attached to the connecting structure 14 in other manners such as by welding, fasteners, adhesive, brazing, and the like. In yet other embodiments, the cutting body 12 and the connecting structure 14 can include interengaging threads. In such embodiments, the threads can be oriented to extend in a direction opposite to the intended direction of rotation of the cutting tool 10 to prevent the cutting body 12 from being unintentionally removed from the connecting structure 14 during operation.

In the illustrated embodiment of FIGS. 1-9, the locking protrusions 22 are curved to at least partially correspond to the curvature of the sidewall 16 of the cutting body 10, and each of the locking protrusions 22 extends approximately 45 degrees about the circumference of the second end 20 of the body 12. In the illustrated embodiment, the cutting body 12 includes four locking protrusions 22 extending from the second end 20. In other embodiments, the cutting body 12 can include one, two, three, five, or more locking protrusions 22, and each of the locking protrusions 22 can extend more or less than 45 degrees about the circumference of the body 12.

In the illustrated embodiment of FIGS. 1-9, each of the locking protrusions 22 is similarly sized and similarly shaped, and the locking protrusions 22 are spaced around the circumference of the second end 20 at substantially regular intervals to define similarly sized gaps 25 between adjacent locking protrusions 22. In other embodiments, each of the locking protrusions 22 can be differently sized and/or differently shaped, and the locking protrusions 22 can be spaced around the circumference of the second end 20 at irregular intervals to define differently sized gaps 25 between adjacent locking protrusions 22.

Figure 2:
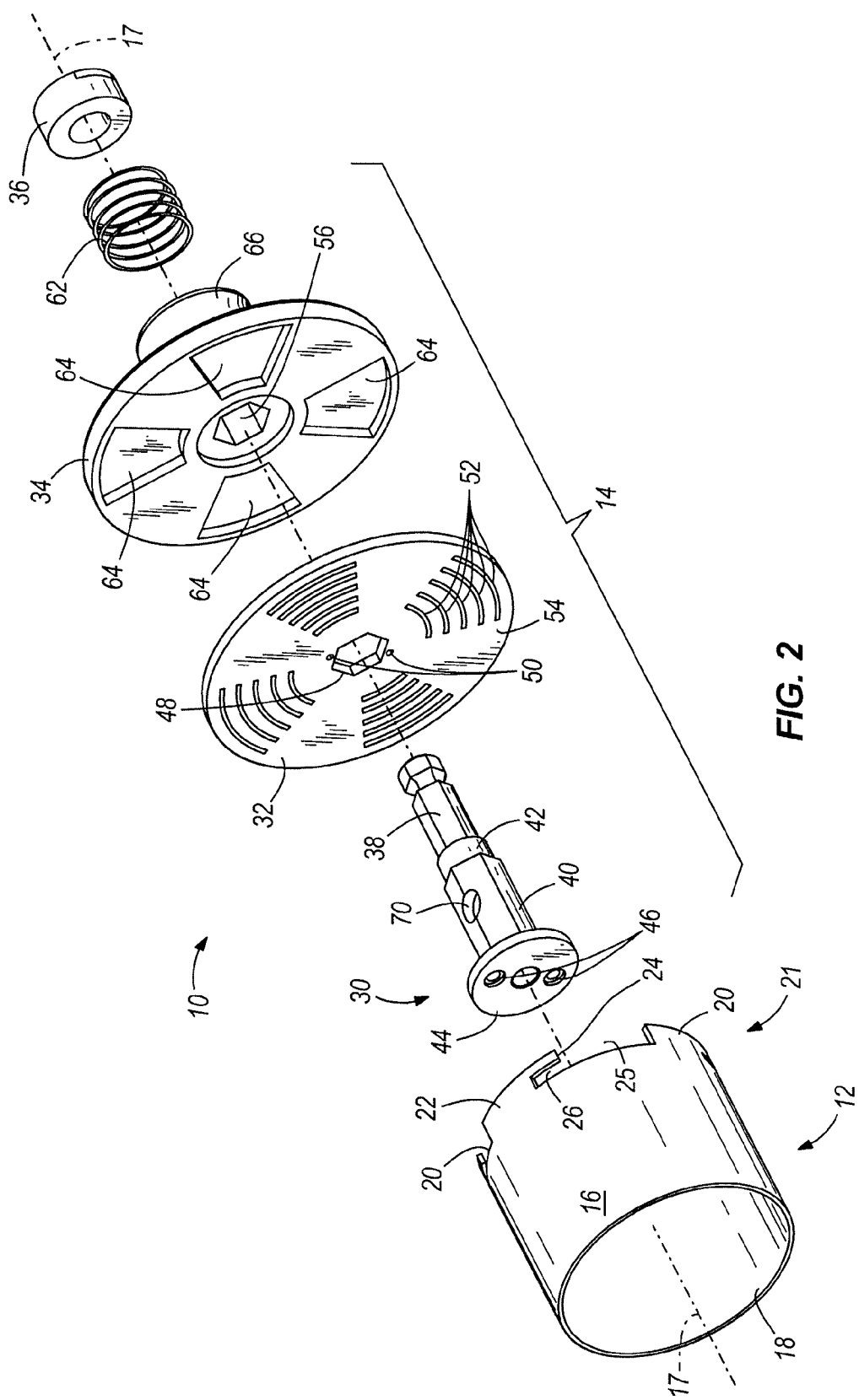
FIG. 2 is a first exploded perspective view of the cutting tool shown in FIG. 1.
Figure 3:
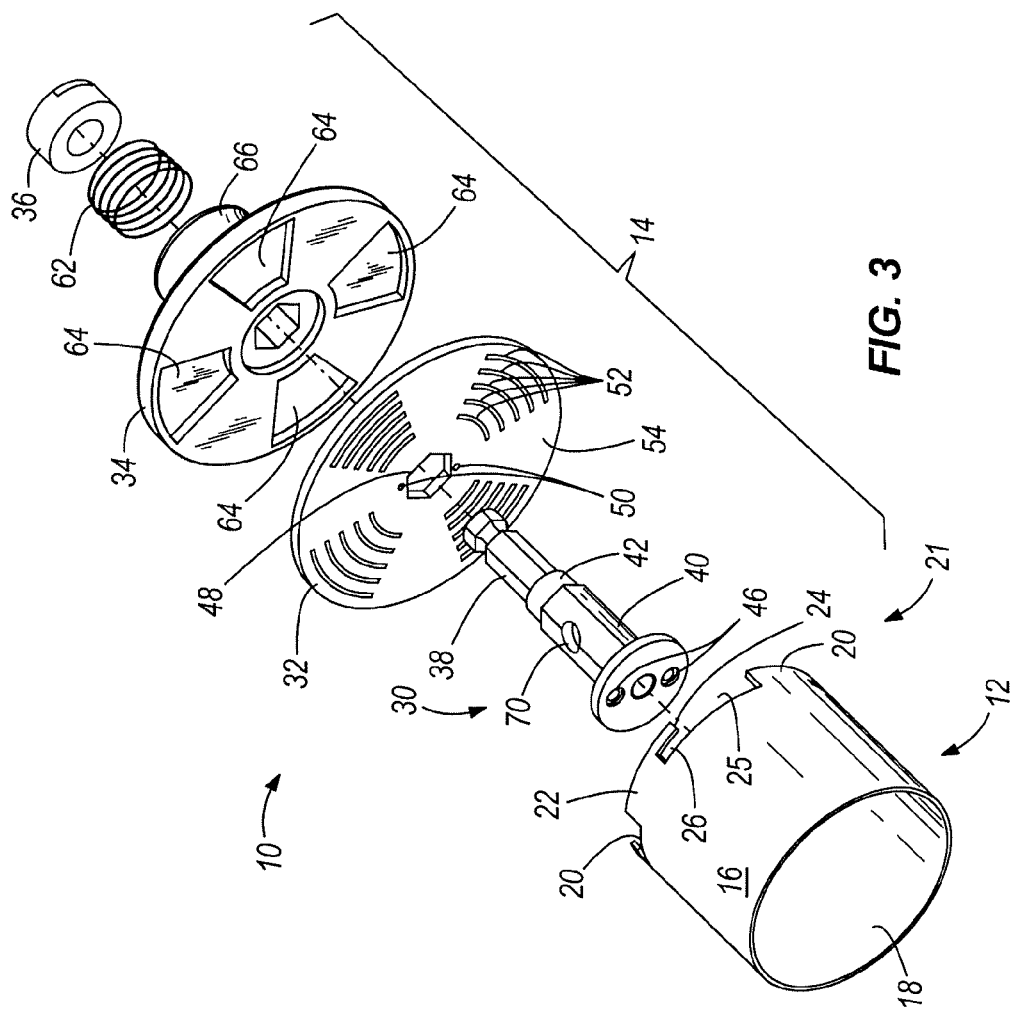
FIG. 3 is a second exploded perspective view of the cutting tool shown in FIG. 1.
Figure 4:
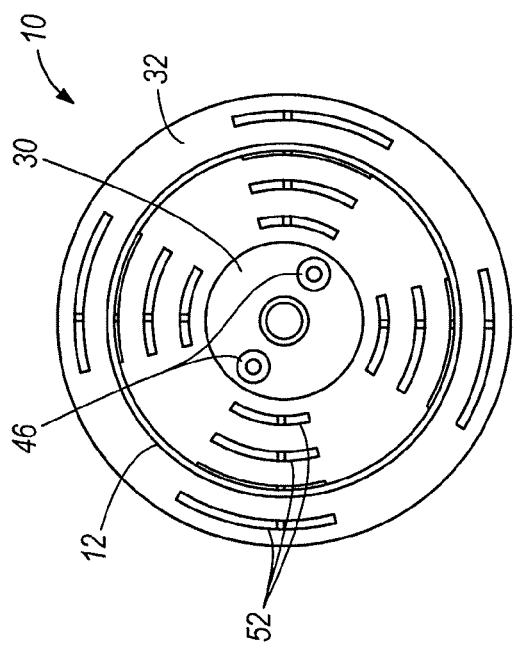
FIG. 4 is a front view of the cutting tool shown in FIG. 1.
Figure 5:
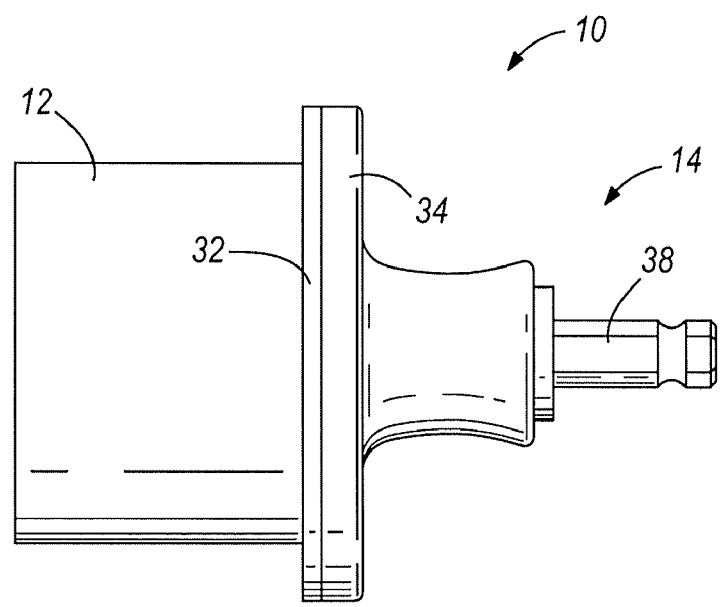
FIG. 5 is a side view of the cutting tool shown in FIG. 1.

As best shown in FIGS. 2 and 3, the locking protrusions 22 can include outwardly extending locking tabs 24. In the illustrated embodiment of FIGS. 1-9, the locking tabs 24 extend outwardly in a generally-circumferential direction from each of the locking protrusions 22 to define locking recess 26 between the locking tabs 24 and the second end 20 of the cutting body 12. In other embodiments, the locking tabs 24 can extend outwardly from the locking protrusions 22 in a generally radial direction (e.g., radially inwardly from the locking protrusions 22 and/or radially outwardly from the locking protrusions 22).

As best shown in FIGS. 2 and 3, the connecting structure 14 can include a drive shaft 30. The connecting structure 14 can also include a connecting plate 32, a locking member 34, and a locking flange 36 supported on the drive shaft 30 for axial movement along the drive shaft 30.

Figure 6:
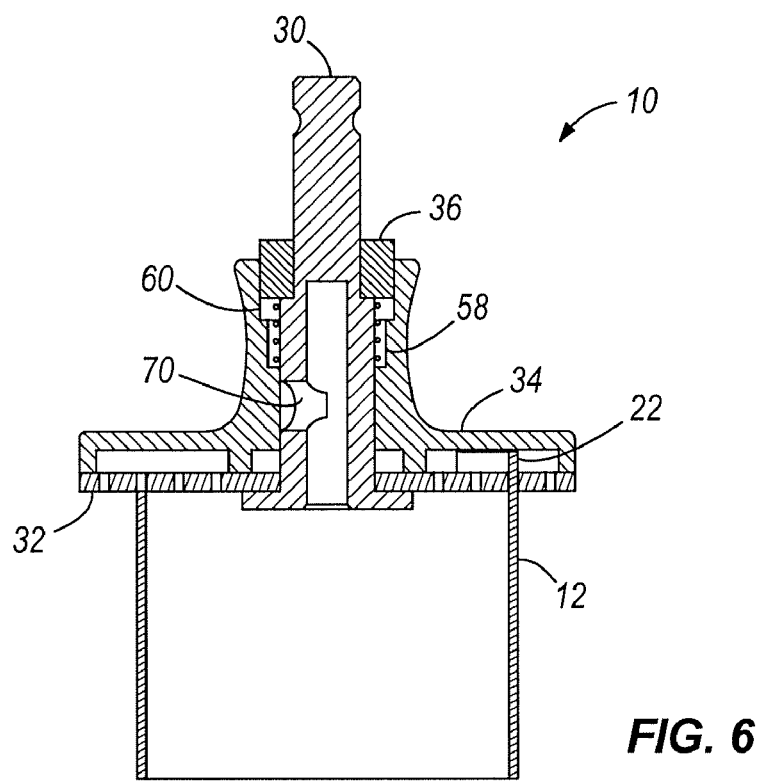
FIG. 6 is a cross-sectional view of the cutting tool shown in FIG. 1.
Figure 7:
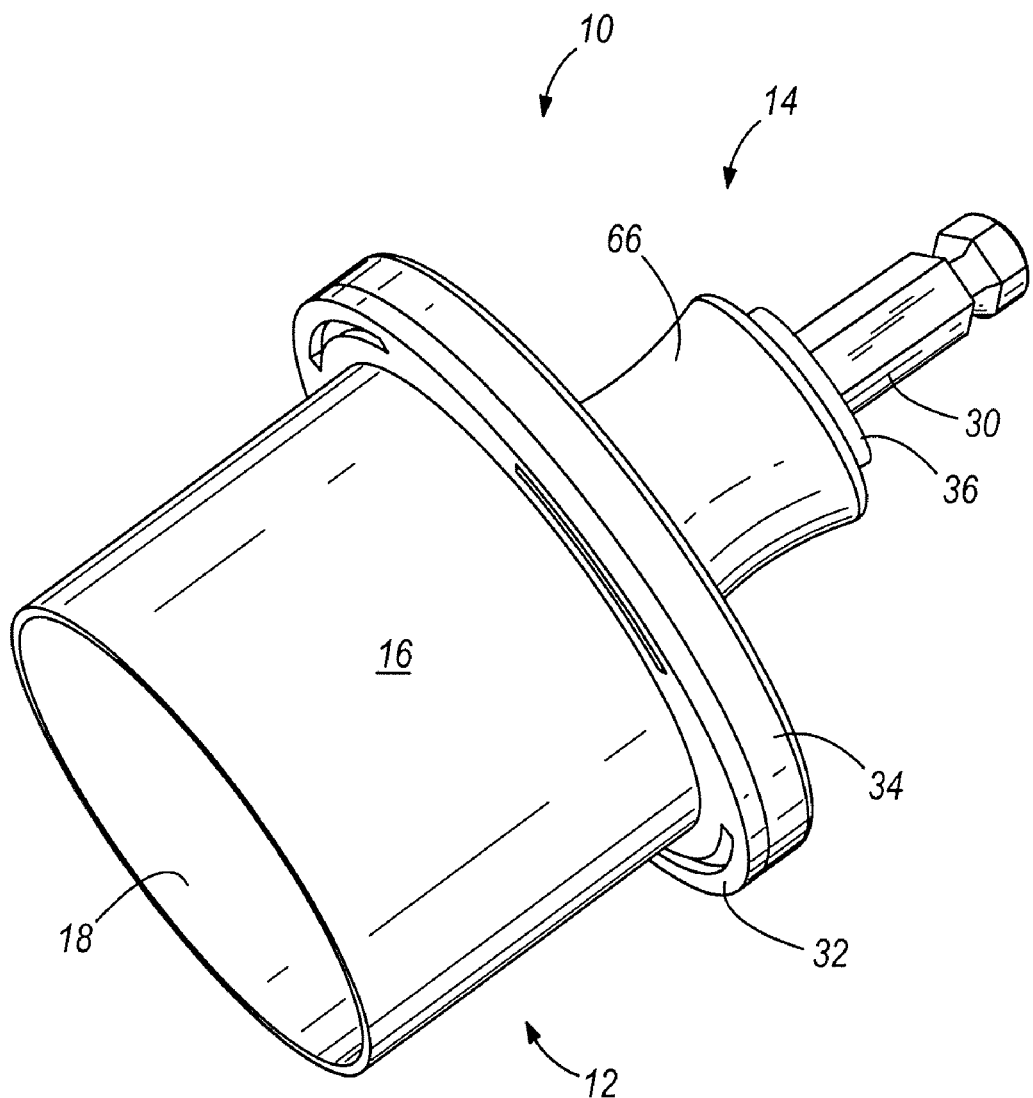
FIG. 7 is another front perspective of the cutting tool shown in FIG. 1.
Figure 8:
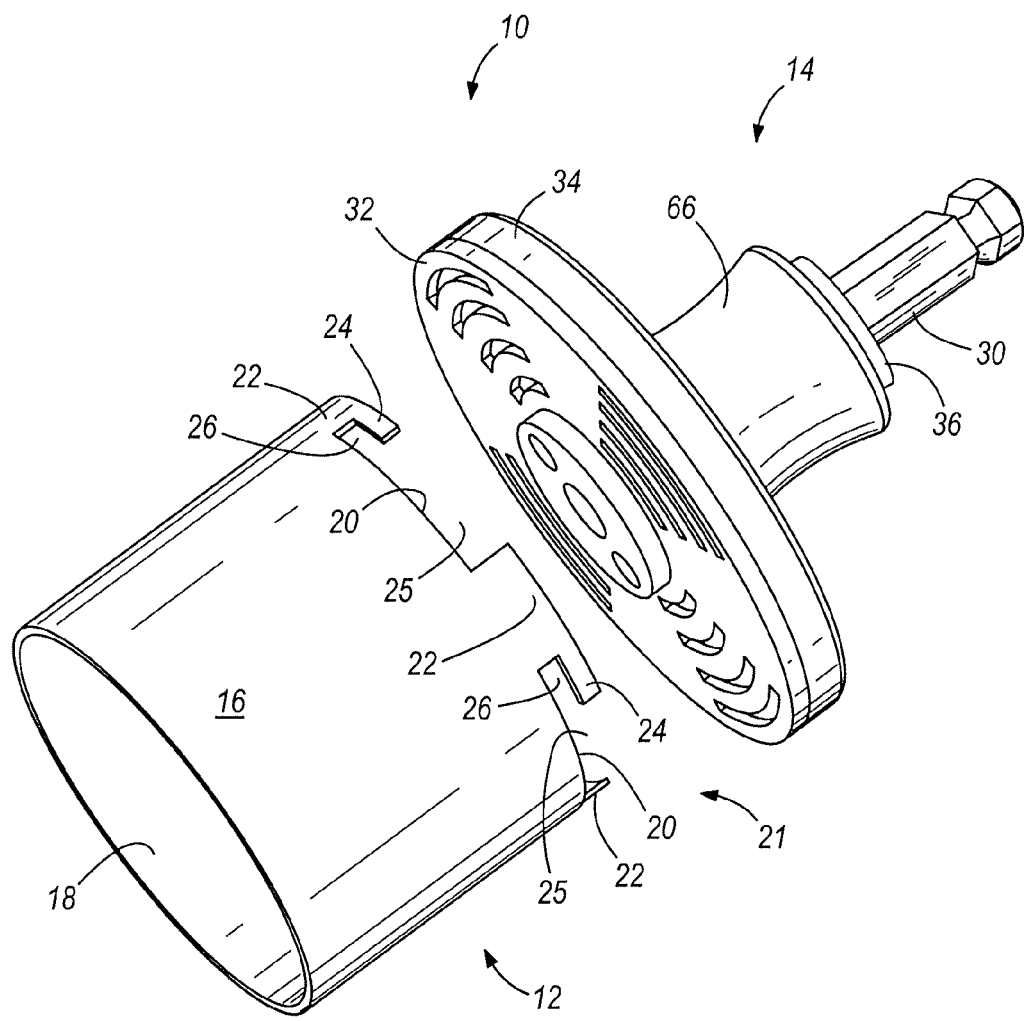
FIG. 8 is a partially exploded perspective view of the cutting tool shown in FIG. 7.
Figure 9:
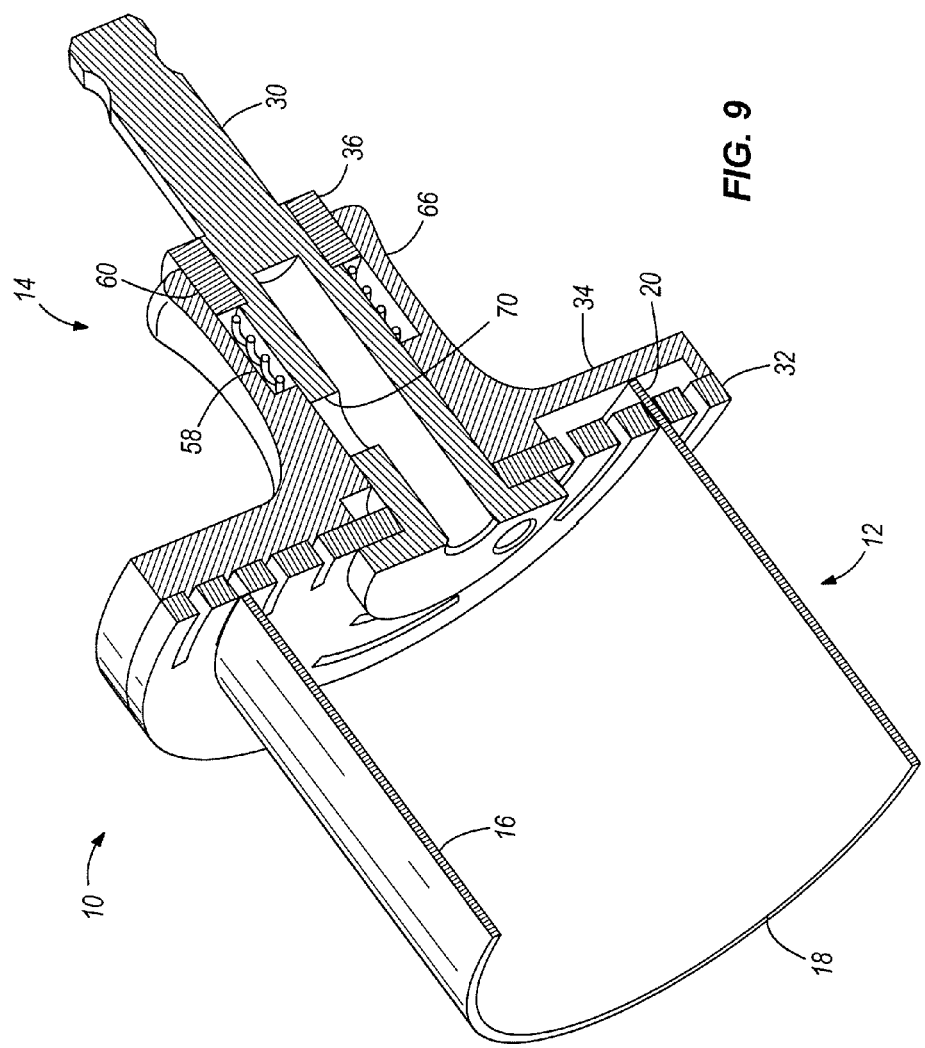
FIG. 9 is a cross-sectional view of the cutting tool shown in FIG. 7.

A rearward end of the drive shaft 30 can include a tool engagement portion 38 configured to be received in a tool holder or chuck of a power tool. As shown in FIGS. 2, 3, and 6, a forward end of the drive shaft 30 can include a drive portion 40 configured to slidingly support the connecting plate 32 and the locking member 34.

In the illustrated embodiment of FIGS. 1-9, the tool engagement portion 38 and the drive portion 40 have substantially hexagonal cross-sectional shapes and include six flat sides. In other embodiments, the tool engagement portion 38 and the drive portion 40 can have other cross-sectional shapes, such as, for example, round, triangular, rectangular, trapezoidal, or any other polygonal shape, oval, irregular, and the like and can include zero, one, or more flat sides. The drive shaft 30 can also include a threaded portion 42 and a radially-outwardly extending flange 44 defining apertures 46, which are explained in greater detail below.

In the illustrated embodiment of FIGS. 1-9, the connecting plate 32 defines a central aperture 48 having a hexagonal shape substantially identical to the cross-sectional shape of the drive portion 40 of the drive shaft 30. In other embodiments where the cross-sectional shape of the drive portion 40 is other than hexagonal, the central aperture 48 can be similarly shaped.

As shown in FIGS. 1-9, threaded apertures 50 can extend into the connecting plate 32 adjacent to the central aperture 48. When the cutting tool 10 is assembled, the connecting plate 32 can abut the flange 42 such that the drive portion 40 of the drive shaft 30 extends through the central aperture 48 and threaded fasteners (not shown) extend through the apertures 46 in the flange 44 and thread into the apertures 50 in the connecting plate 32 to secure the connecting plate 32 to the flange 44 of the drive shaft 30.

The connecting plate 32 can also include radially-spaced sets of slots 52 and webs 54 extending between the slots 52. Each set of slots 52 can be configured to receive a cutting body 12 having a specific diameter, and thus each set of slots 52 can be positioned at a radial distance from the approximate center of the connecting plate 32 (e.g., from the cutting axis 17). In the illustrated embodiment, each set includes four slots 52 that are configured to receive the four locking protrusions 22 extending outwardly from the body 12. In other embodiments where the cutting body 12 includes more or less than four locking protrusions 22, each set of slots 52 in the connecting plate 32 can include more or less slots 52 as appropriate.

In the illustrated embodiment, the connecting plate 32 includes four sets of slots 52 configured to receive four different cutting bodies 12 of different diameters. In other embodiments, the connecting plate 32 can include more or less than four sets of slots 52 to accommodate more or less cutting bodies 12. In the illustrated embodiment, the slots 52 can extend for approximately 45 degrees to permit the locking protrusions 22 on the body 12 to fit through the slots 52. In other embodiments where the locking protrusions 22 extend for more or less than 45 degrees, the slots 52 can extend for more or less than 45 degrees such that the slots 52 extend for substantially the same distance as the width of the locking protrusions 22.

The cutting body 12 can be connected to the connecting plate 32 by inserting locking protrusions 22 through an appropriate set of slots 52 until the second end 20 abuts the bottom surface of the connecting plate 32. The cutting body 12 can then be rotated about the cutting axis 17 and relative to the connecting plate 32 such that the locking tabs 24 extend rearwardly across the webs 54 and such that the webs 54 extend through the locking recesses 26 to secure the cutting body 12 to the connecting plate 32 of the connecting structure 14.

The locking member 34 defines a central aperture 56 having a hexagonal shape substantially identical to the cross-sectional shape of the drive portion 40. In other embodiments where the shape of the drive portion 40 is other than hexagonal, the central aperture 56 can be similarly shaped.

In the illustrated embodiment of FIGS. 1-9, the locking member 34 includes a first bore 58 and a second larger bore 60 (shown in FIG. 6) extending through respective forward and rearward ends of the locking member 34. A biasing member 62 can be positioned in the first bore 58 and the locking flange 36 can be threaded onto the threaded portion 42 of the drive shaft 30 and extend into the second bore 60. The biasing member 62 is held in the second bore 60 between the locking flange 36 and a rearward end of the connecting plate 32 to bias the locking member 34 into engagement with the connecting plate 32 (i.e., toward a locked position).

The locking member 34 can also include recesses 64 spaced circumferentially around the first bore 58 and a gripping portion 66 extending circumferentially around the second bore 60. As shown in FIGS. 2 and 3, the recesses 64 and the slots 52 can be similarly shaped and sized. As also shown in FIGS. 2 and 3, when the connecting structure 14 is assembled, the recesses 64 can be angularly offset from the slots 52 by a distance substantially equal to the length of the tabs 24 on the locking protrusions 22.

As best shown in FIGS. 2 and 3, the drive portion 40 of the drive shaft 30 and the locking member 34 can include a detent arrangement 70 for securing the locking member 34 to the drive portion 40. In some such embodiments, the detent arrangement 70 can define a radially extending recess and the locking member 34 can include an outwardly extending protrusion, or alternatively, the locking member 34 can support a radially outwardly biased locking element, such as, for example, a roller for lockingly engaging the recess in the detent arrangement 70 of the drive shaft 30. In other embodiments, the locking member 34 can define a radially extending recess and the detent arrangement 70 can include an outwardly extending protrusion, or alternatively, the detent arrangement 70 can support a radially outwardly biased locking element, such as, for example, a roller for lockingly engaging the recess in the locking member 34.

The cutting tool 10 of the present invention can include a number of differently sized cutting bodies 12 for cutting differently sized holes. In some embodiments, each of the cutting bodies 12 can include a different arrangement of cutting teeth for cutting different materials at different cutting speeds.

Each of the cutting bodies 12 can be secured to the connecting structure 14 to cut holes in or work on a workpiece. In some embodiments, two or more cutting bodies 12 can be secured to the connecting structure 14 simultaneously to facilitate storage and transportation of the cutting tool 10. Alternatively or in addition, two or more cutting bodies 12 can be secured to the connecting structure 14 such that one cutting body 12 guides another cutting body 12 during operation of the cutting tool 10.

In some such embodiments, each of the cutting bodies 12 have a different axial length, with the cutting body 12 having the smallest diameter also having the largest axial length and with each successive cutting body 12 having a larger diameter and a smaller axial length. In these embodiments, an operator can cut a first hole of a first diameter using a first cutting body 12. If the operator desires to enlarge the hole but still desires to maintain the approximate center of the hole, the operator can secure a second cutting body 12 having a larger diameter and a shorter axial length than the first cutting body 12 to the connecting structure 14. In this manner, the operator can align the first cutting body 12 with the previously cut hole and can use the first cutting body 12 as a pilot to orient the second cutting body 12 with respect to the workpiece such that the hole cut by the second cutting body 12 is axially aligned with and has the same center as the hole cut by the first cutting body 12.

In operation, an operator can select a cutting body 12 of a desired size and can connect the cutting body 12 to the connecting structure 14. To connect a cutting body 12 to the connecting structure 14, the operator grips the gripping portion 66 of the locking member 34 and moves the locking member 34 rearwardly along the drive shaft 30 from a locked position toward an unlocked position, compressing the biasing member 62 against a forward side of the locking flange 36.

The operator can then align the locking protrusions 22 of the cutting body 12 with the corresponding slots 52 in the connecting plate 32, move the locking protrusions 22 axially into the corresponding slots 52, and pivot the cutting body 12 about the cutting axis 17 in a circumferential direction such that the locking tabs 24 are moved across the webs 54 of the connecting plate 32 and such that the webs 54 engage the locking recesses 26 between the second end 20 of the cutting body 12 and the forward ends of the locking tabs 24. Thereafter, the operator can release the gripping portion 66 of the locking member 34 such that the bias member 62 pushes the locking member 34 forwardly from the unlocked position toward the locked position and into engagement with the connecting plate 32 and into engagement with the locking tabs 24 of the cutting body 12, securing the locking tabs 24 between the connecting plate 32 and the locking member 34.

The operator can then connect the tool engagement portion 38 of the drive shaft 30 to a power tool such that the power tool can rotate the cutting tool 10 about the cutting axis 17 to cut a hole in or work on a workpiece.

To remove the cutting body 12 from the connecting structure 14, an operator can grip the gripping portion 66 to move the locking member 34 from the locked position axially away from the connecting plate 32 toward the unlocked position. The operator can then pivot the cutting body 12 circumferentially to move the locking tabs 24 out of engagement with the webs 54 of the locking member 34 so that the cutting body 12 can be moved axially away from the connecting structure 14.

Figure 10:
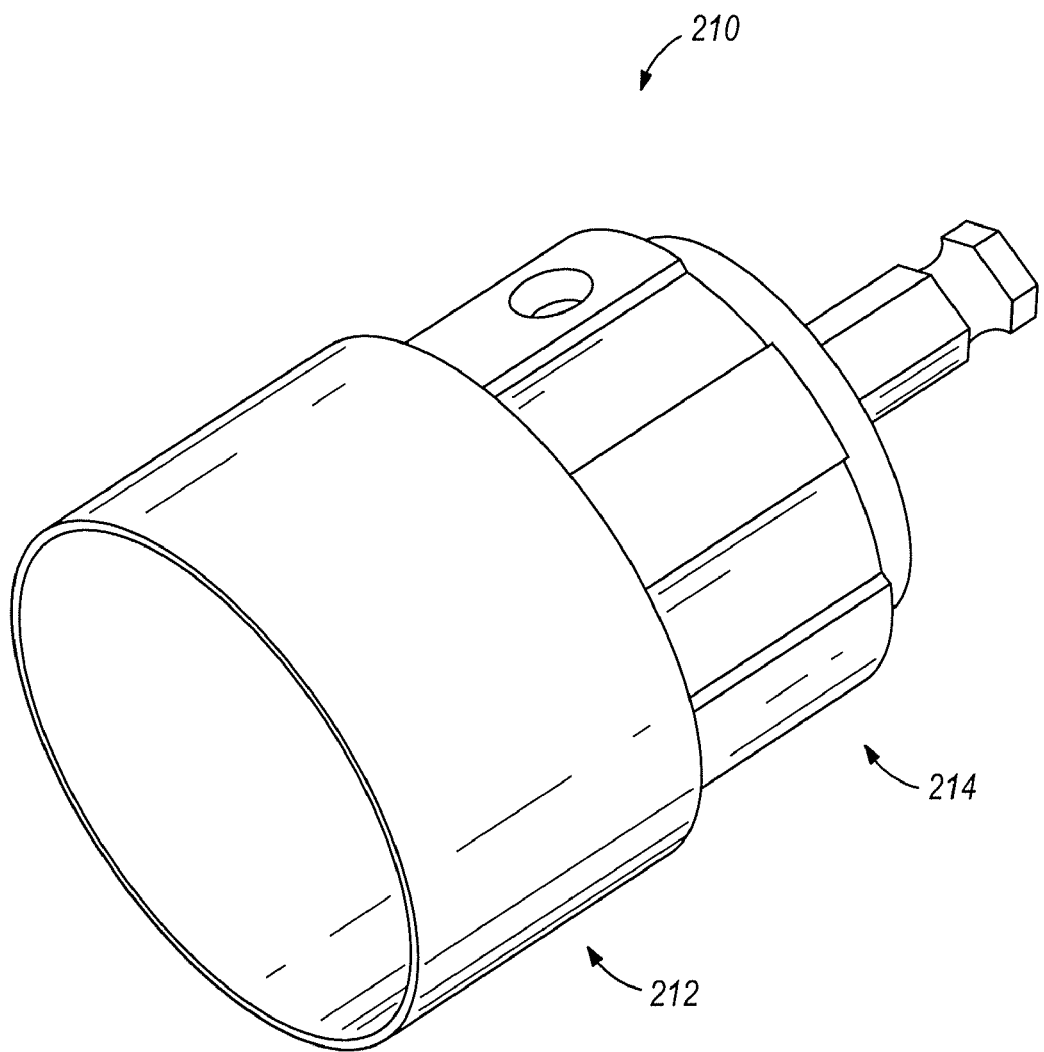
FIG. 10 is a first perspective view of a cutting tool according to another embodiment of the present invention.
Figure 11:
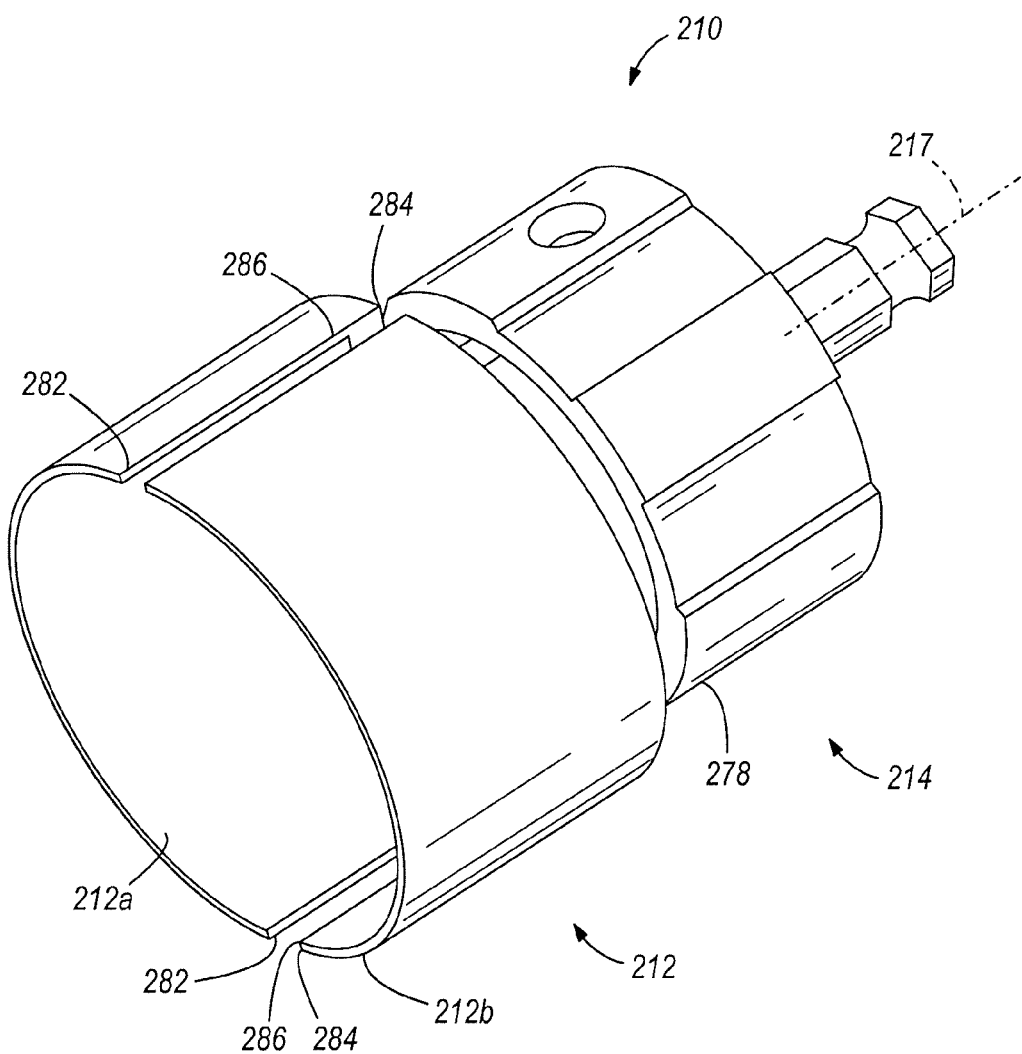
FIG. 11 is a second perspective view of the cutting tool shown in FIG. 10.
Figure 12:
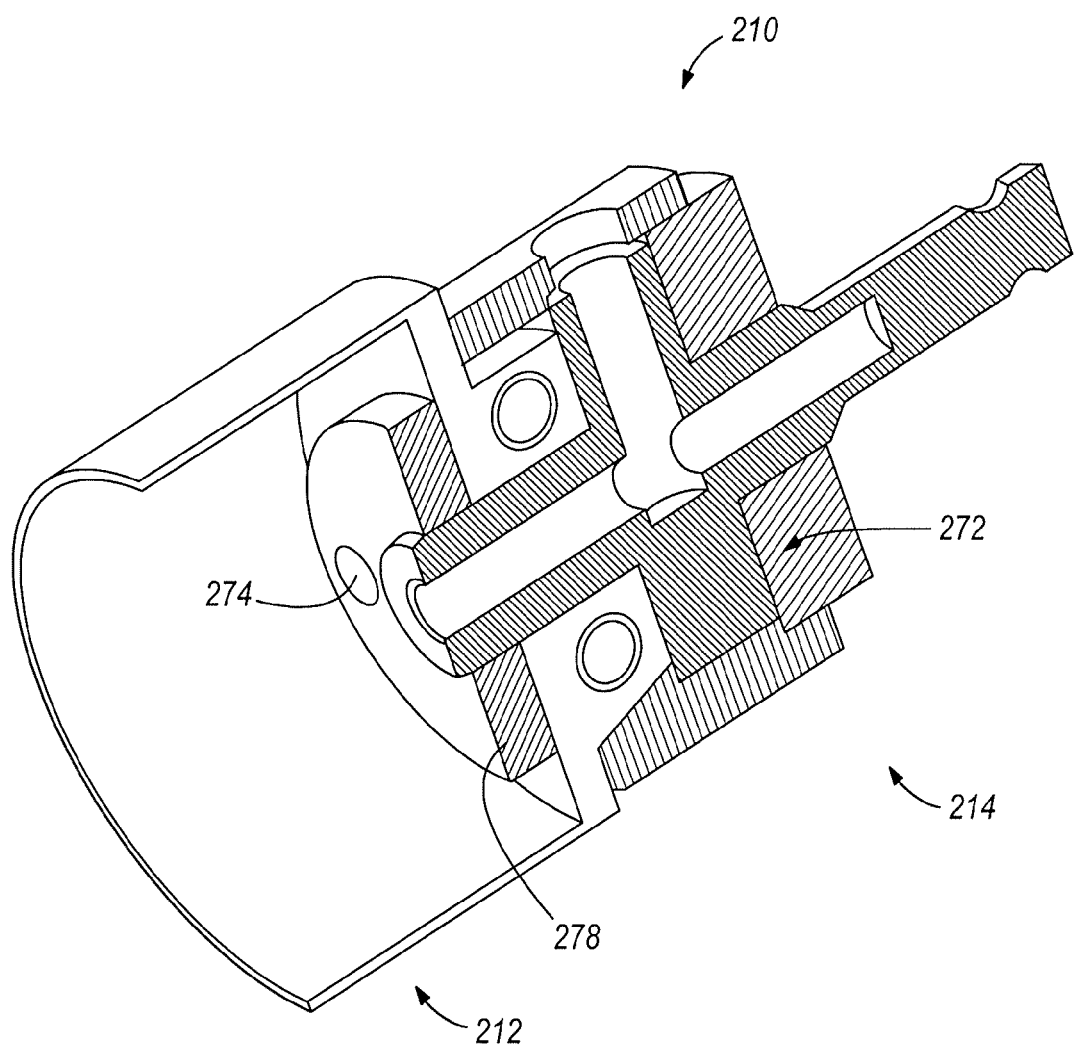
FIG. 12 is a cross-sectional view of the cutting tool shown in FIG. 10.

FIGS. 10-12 illustrate another embodiment of a cutting tool 210 according to the present invention. The cutting tool 210 shown in FIGS. 10-12 is similar in many ways to the illustrated embodiments of FIGS. 1-9 described above. Accordingly, with the exception of mutually inconsistent features and elements between the embodiment of FIGS. 10-12 and the embodiments of FIGS. 1-9, reference is hereby made to the description above accompanying the embodiments of FIGS. 1-9 for a more complete description of the features and elements (and the alternatives to the features and elements) of the embodiment of FIGS. 10-12. Features and elements in the embodiment of FIGS. 10-12 corresponding to features and elements in the embodiments of FIGS. 1-9 are numbered in the 200 series.

As shown in FIGS. 10-12, the cutting tool 210 includes a cutting body 212 secured to a connecting structure 214. The forward end of the cutting body 212 can include outwardly extending teeth for cutting a workpiece, or alternatively, the forward end of the cutting body 12 can include an abrasive material suitable for cutting, grinding, and/or polishing a workpiece. In other embodiments, the forward end can also or alternatively include outwardly-extending bristles (e.g., wire bristles) suitable for cutting, grinding, and/or polishing a workpiece.

In some embodiments, such as the illustrated embodiment of FIGS. 10-12, the connecting structure 214 can include a plug ejecting assembly 272. In these embodiments, the connecting structure 214 can include one or more ejecting elements 274. Each of the ejecting elements 274 is supported in the connecting structure 214 for axial movement between a recessed position (shown in FIG. 12), in which the ejecting element 274 is prevented from extending into the cutting body 212, and an extended position (not shown), in which the ejecting element 274 extends forwardly from the connecting structure 214 into the interior of the cutting body 12. In some such embodiments, the connecting structure 214 also includes biasing elements for biasing the ejecting elements 274 toward the recessed position.

In embodiments, such as the illustrated embodiment of FIGS. 10-12 having a plug ejecting assembly 272, an operator can move the ejecting elements 274, or alternatively, an actuator in operational engagement with the ejecting elements 274, axially along the connecting structure 214 to move the ejecting elements 274 from the recessed position toward the extended position to eject a plug or portion of a workpiece from the cutting body 12.

In some embodiments, the cutting body 212 can be movably connected to the connecting structure 214 or to a portion of the connecting structure 214. In the illustrated embodiment of FIGS. 10-12, a forward end of the connecting structure 214 supports a sleeve 278. In the illustrated embodiment, a first cutting body 212a and a second cutting body 212b are supported on and extend outwardly from a forward end of the sleeve 278. In other embodiments, two, three, or more cutting bodies 212a, 212b can be supported on and extend outwardly from the connecting structure 214 or the sleeve 278. These cutting bodies 212a, 212b can be similarly or differently sized.

During operation of the cutting tool 212, the first and second cutting bodies 212a, 212b are maintained in a first orientation (shown in FIG. 10), in which ends 282 of the first cutting body 212a engage ends 284 of the second cutting body 212b. After a cutting operation, an operator can move the first and second cutting bodies 212a, 212b with respect to the sleeve 278 toward a second orientation (shown in FIG. 11), in which the ends 282 of the first cutting body 212a are spaced a distance from the ends 284 of the second cutting body 212b to form gullets 286 between the first and second cutting bodies 212a, 212b. In some embodiments, the gullets 286 are sized to allow an operator to insert one or more fingers or thumbs through the gullets 286 to grasp a plug supported in the cutting tool 210.

In some embodiments, the first and second cutting bodies 212a, 212b can be threaded onto the forward end of the sleeve 278. In other embodiments, the first and second cutting bodies 212a, 212b and the sleeve 278 can include other interengaging elements for securing the first and second cutting bodies 212a, 212b to the sleeve 278 and for allowing movement of the first and second cutting bodies 212a, 212b between the first and second orientations. In this manner, after cutting a workpiece, an operator can pivot the first and second cutting bodies 212a, 212b relative to the sleeve 278 about the cutting axis 217 to move the first and second cutting bodies 212a, 212b from the first orientation toward the second orientation.

Alternatively, in some embodiments, the first and second cutting bodies 212a, 212b can include ramped surfaces for cammingly engaging the outer surface of the sleeve 278. In these embodiments, an operator can move the first and second cutting bodies 212a, 212b axially along the cutting axis 217 relative to the sleeve 278 to move the first and second cutting bodies 212a, 212b from the first orientation toward the second orientation.

The cutting tool 210 can also include an elastic member for biasing the first and second cutting bodies 212a, 212b toward the first orientation, or alternatively, for biasing the first and second cutting bodies 212a, 212b toward the second orientation.

After moving the first and second cutting bodies 212a, 212b from the first orientation toward the second orientation, an operator can tilt the cutting tool 210 upwardly so that the plug falls out of the forward end of the cutting tool 210. Alternatively or in addition, the operator can grasp opposite sides of the plug through the gullets 286 and pull the plug forwardly and out of the front end of the cutting tool 210. After the plug is removed, the operator can return the first and second cutting bodies 212a, 212b to the second orientation to continue cutting operations.

Figure 13:
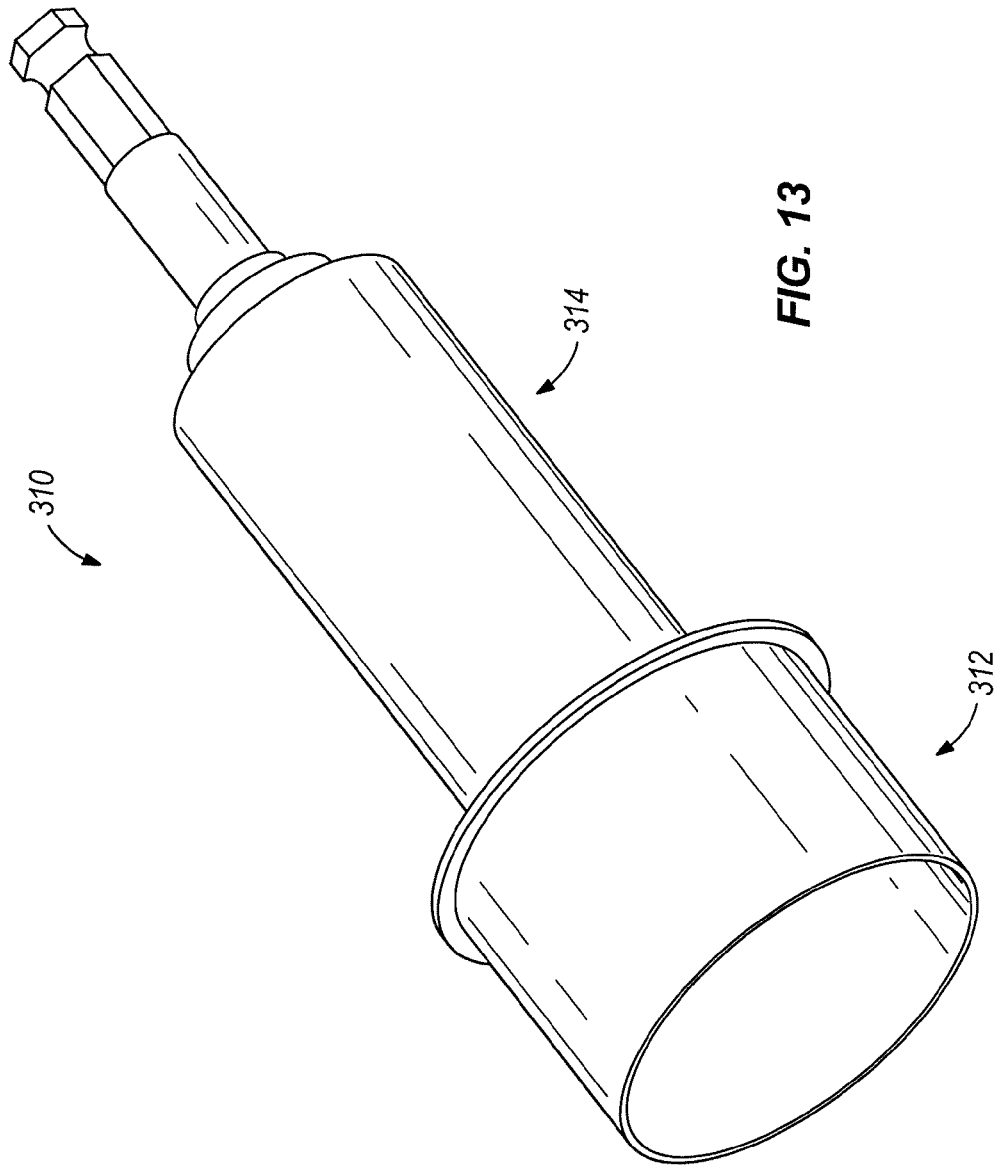
FIG. 13 is a first perspective view of a cutting tool according to another embodiment of the present invention.
Figure 14:
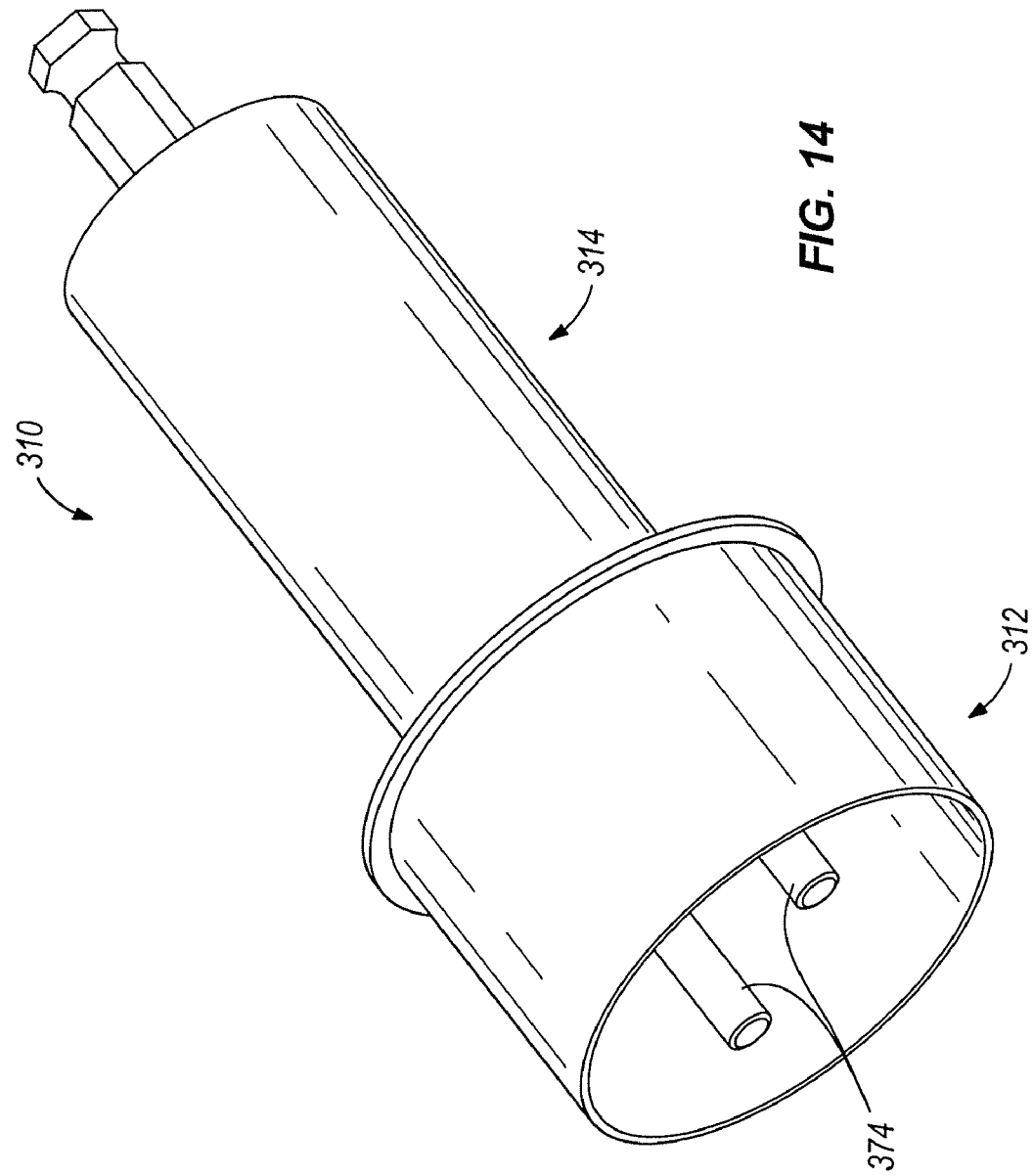
FIG. 14 is second perspective view of the cutting tool shown in FIG. 10.
Figure 15:
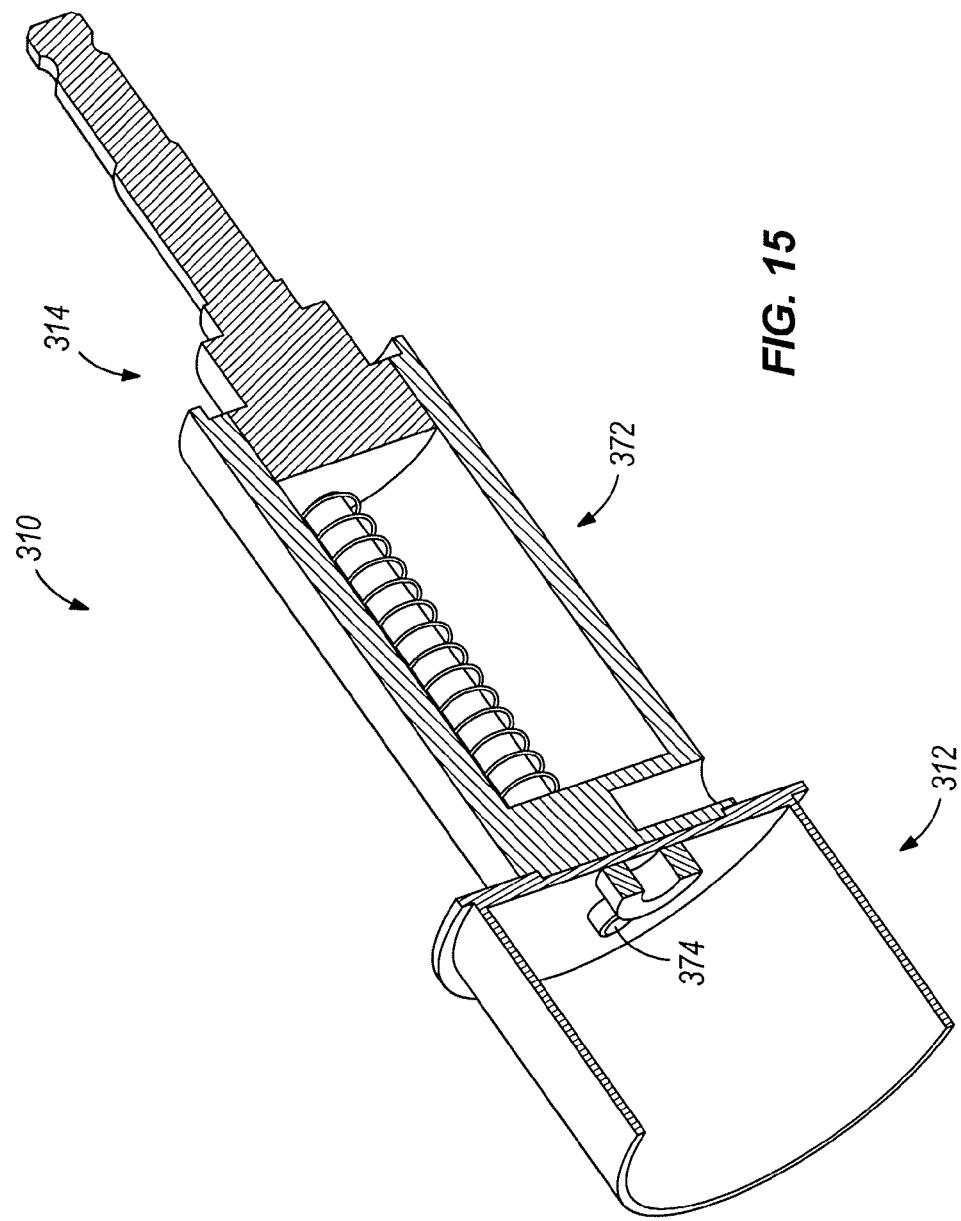
FIG. 15 is cross-sectional view of the cutting tool shown in FIG. 10.

FIGS. 13-15 illustrate another embodiment of a cutting tool 310 according to the present invention. The cutting tool 310 shown in FIGS. 13-15 is similar in many ways to the illustrated embodiments of FIGS. 1-12 described above. Accordingly, with the exception of mutually inconsistent features and elements between the embodiment of FIGS. 13-15 and the embodiments of FIGS. 1-12, reference is hereby made to the description above accompanying the embodiments of FIGS. 1-12 for a more complete description of the features and elements (and the alternatives to the features and elements) of the embodiment of FIGS. 13-15. Features and elements in the embodiment of FIGS. 13-15 corresponding to features and elements in the embodiments of FIGS. 1-12 are numbered in the 300 series.

The cutting tool 310 of the embodiment of FIGS. 13-15 includes a plug ejecting assembly 372 having two ejecting elements 374 movable through the connecting structure 314 between recessed positions and extended positions to eject a plug from the cutting body 312.

Figure 16:
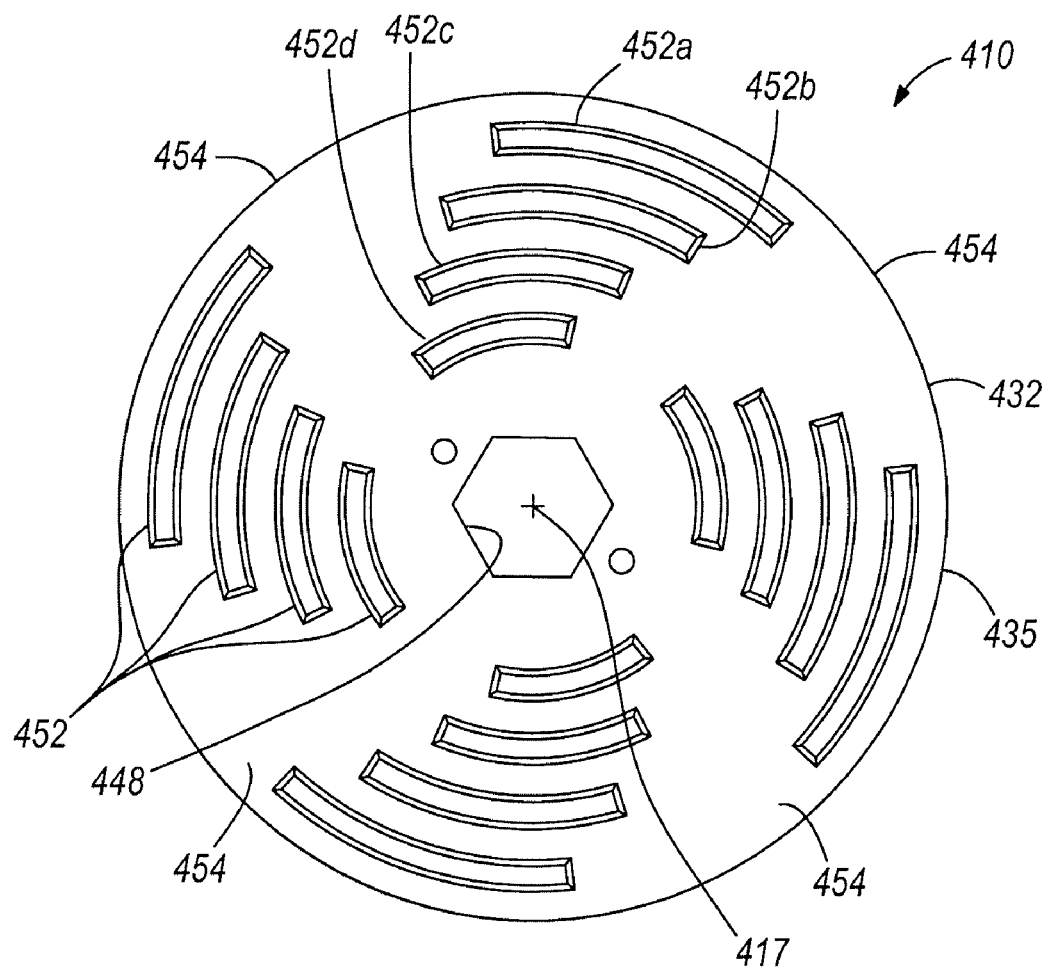
FIG. 16 is a front view of a portion of a cutting tool according to another embodiment of the present invention.

FIG. 16 illustrates another embodiment of a cutting tool 410 according to the present invention. The cutting tool 410 shown in FIG. 16 is similar in many ways to the illustrated embodiments of FIGS. 1-15 described above. Accordingly, with the exception of mutually inconsistent features and elements between the embodiment of FIG. 16 and the embodiments of FIGS. 1-15, reference is hereby made to the description above accompanying the embodiments of FIGS. 1-15 for a more complete description of the features and elements (and the alternatives to the features and elements) of the embodiment of FIG. 16. Features and elements in the embodiment of FIG. 16 corresponding to features and elements in the embodiments of FIGS. 1-15 are numbered in the 400 series.

Although not shown in FIG. 16, the cutting tool 410 can include a cutting body and a connecting structure, such as the cutting body 12 and the connecting structure 14 described above with respect to the embodiment of FIGS. 1-9. The cutting tool 410 of the embodiment of FIG. 16 can also include a locking arrangement for selectively securing the cutting body to the connecting structure.

In the illustrated embodiment of FIG. 16, the locking arrangement includes a connecting plate 432, which defines a central aperture 448 having a hexagonal shape substantially identical to the cross-sectional shape of a drive portion of a drive shaft. In other embodiments where the cross-sectional shape of the drive portion is other than hexagonal, the central aperture 448 can be similarly shaped. In addition, the connecting plate 432 can at least partially define a cutting axis 417 extending axially through the central aperture 448.

The connecting plate 432 can also include radially-spaced sets of slots 452 and webs 454 extending between the slots 452 and between the central aperture 448 and an outer edge 435 of the connecting plate 432. Each set of slots 452 can be configured to receive a cutting body 12 having a specific diameter, and thus each set of slots 452 can be positioned at a different radial distance from the approximate center of the connecting plate 432 (e.g., from the cutting axis 417). In the illustrated embodiment, each set includes four slots 452 that are configured to receive four locking protrusions extending outwardly from a different cutting body. In other embodiments, each set of slots 452 in the connecting plate 432 can include more or less slots 452 as appropriate to receive the locking protrusions of a cutting body.

In the illustrated embodiment, the connecting plate 432 includes four sets of slots 452 configured to receive four different cutting bodies of different diameters. In other embodiments, the connecting plate 432 can include more or less than four sets of slots 452 to accommodate more or less cutting bodies. In the illustrated embodiment, the slots 452 can extend for approximately 45 degrees to permit the locking protrusions of the body to fit through the slots 452 and lockingly engage the webs 454, as described below in greater detail. In other embodiments where the locking protrusions extend for more or less than 45 degrees, the slots 452 can extend for more or less than 45 degrees so that the slots 452 extend for substantially the same distance as the width of the locking protrusions.

A cutting body can be connected to the connecting plate 432 by inserting the locking protrusions of the cutting body through an appropriate set of slots 452 and rotating the cutting body about the cutting axis 417 and relative to the connecting plate 432 such that the locking protrusions lockingly engage the webs 454 of the connecting plate 432 to secure the cutting body to the connecting plate 432.

In the illustrated embodiment of FIG. 16, each set of slots 452 is circumferentially offset with respect to the adjacent set(s) of slots 452. More specifically, a first slot (i.e., the top slot 452a in FIG. 16) of the radially outer-most set of slots 452 is positioned at a first location (i.e., at approximately one o'clock), a first slot (i.e., the top slot 452b in FIG. 16) of the adjacent set of slots 452 is positioned at a second location (i.e., at approximately twelve o'clock), a first slot (i.e., the top slot 452c in FIG. 16) of the adjacent set of slots 452 is positioned at a third location (i.e., at approximately eleven o'clock), and a first slot (i.e., the top slot 452d in FIG. 16) of the adjacent set of slots 452 is positioned at a fourth location (i.e., at approximately ten o'clock) so that no slot 452 is circumferentially aligned with an adjacent slot 452. In addition, in such embodiments, each of the webs 454 can have an arcuate shape, as shown in FIG. 16.

In embodiments, such as the illustrated embodiment of FIG. 16, in which each set of slots 452 is circumferentially offset with respect to the adjacent set(s), a greater number of sets of slots 452 can be provided on a single connecting plate 432, and the sets of slots 452 can be positioned relatively closely to adjacent sets of slots 452 without significantly reducing the strength or rigidity of the connecting plate 432.

FIGS. 17-20 illustrate another embodiment of a cutting tool 510 according to the present invention. The cutting tool 510 shown in FIGS. 17-20 is similar in many ways to the illustrated embodiments of FIGS. 1-16 described above. Accordingly, with the exception of mutually inconsistent features and elements between the embodiment of FIGS. 17-20 and the embodiments of FIGS. 1-16, reference is hereby made to the description above accompanying the embodiments of FIGS. 1-16 for a more complete description of the features and elements (and the alternatives to the features and elements) of the embodiment of FIGS. 17-20. Features and elements in the embodiment of FIGS. 17-20 corresponding to features and elements in the embodiments of FIGS. 1-16 are numbered in the 500 series.

Figure 17:
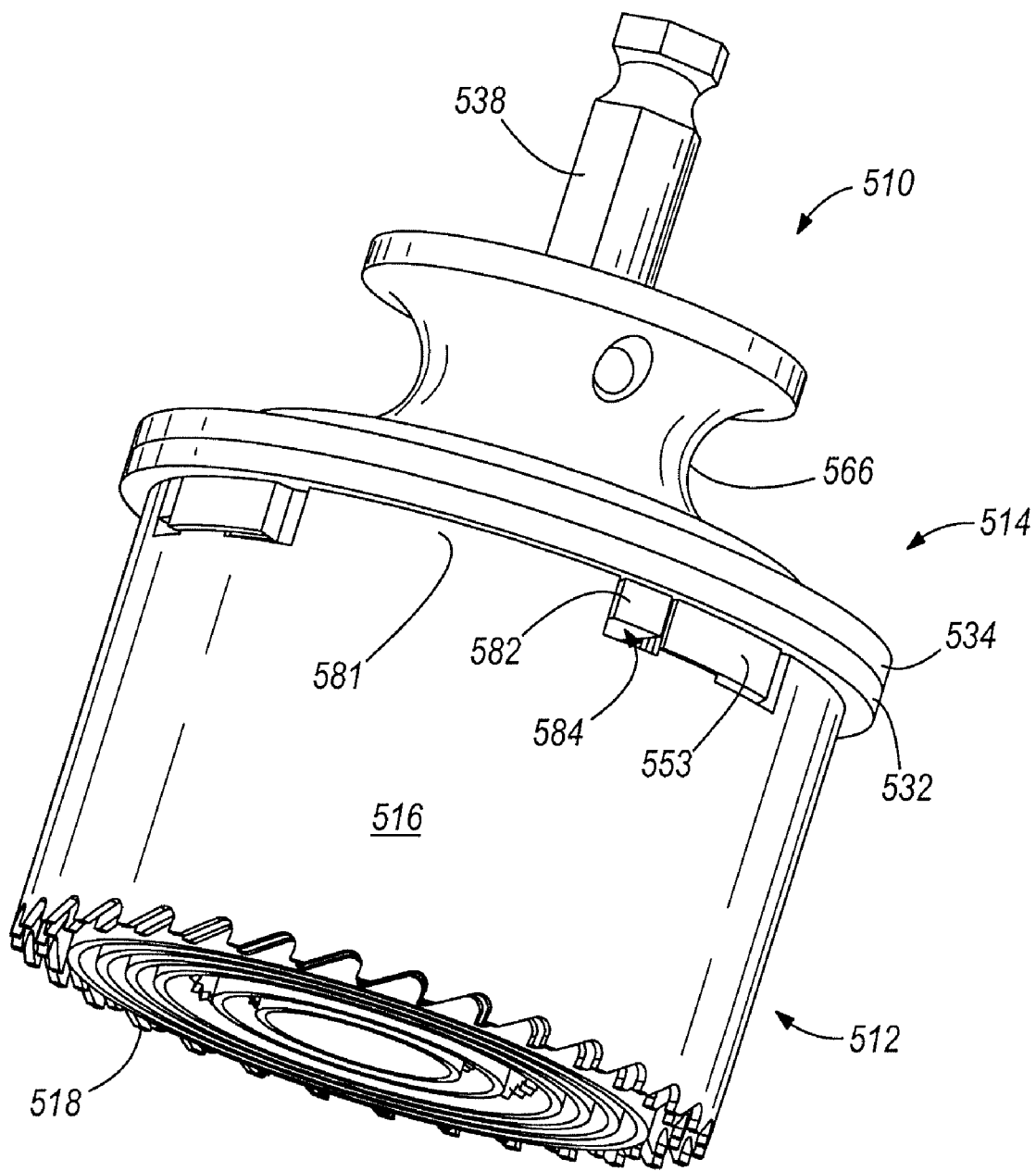
FIG. 17 is a front perspective view of a cutting tool according to another embodiment of the present invention.
Figure 18:
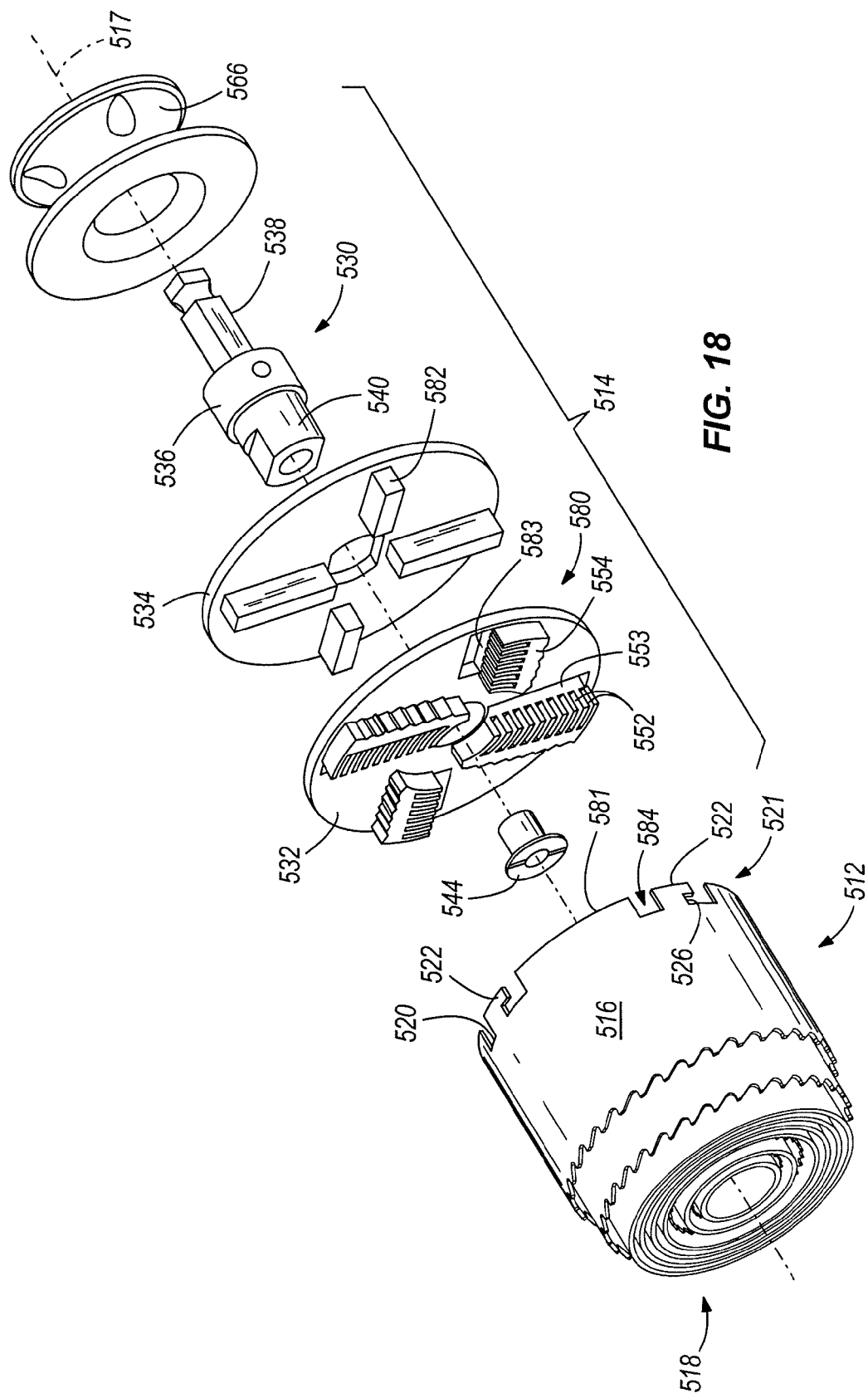
FIG. 18 is a first exploded perspective view of the cutting tool shown in FIG. 17.

As shown in FIGS. 17-18, the cutting tool 510 includes a cutting body 512 and a connecting structure 514. The cutting body 512 can include a generally cylindrically-shaped side wall 516 defining a cutting axis 517, a first or workpiece-engaging end 518, and a second or rearward end 520. The first end 518 can include a number of outwardly-extending cutting teeth arranged in numerous configurations.

The cutting tool 510 can also include a locking arrangement 521 for selectively securing the cutting body 512 to the connecting structure 514. In the illustrated embodiment of FIGS. 17-18, the locking arrangement 521 includes locking protrusions 522 extending rearwardly from the second end 520 of the cutting body 512 in a direction generally parallel to the cutting axis 517 for selectively engaging correspondingly shaped slots 552 arranged circumferentially around the connecting plate 532 of the connecting structure 514. The slots 552 are formed in locking bodies 553 that extend forwardly from the connecting structure 514.

As best shown in FIGS. 17 and 18, the connecting structure 514 can include a drive shaft 530. The connecting structure 514 can also include a connecting plate 532, a locking member 534, and a locking flange 536 supported on the drive shaft 530 for axial movement along the drive shaft 530.

The cutting tool 510 can also include a driving arrangement 580 for transferring torque from the drive shaft 530 to the cutting body 512. In the illustrated embodiment of FIGS. 17-18, the driving arrangement 580 includes driving protrusions 581 extending rearwardly from the second end 520 of the cutting body 512 in a direction generally parallel to the cutting axis 517. The driving protrusions 581 are positioned in between the locking protrusions 522. The locking member 534 includes driving bars 582 extending forwardly. The driving bars 582 are received in elongated slots 583 extending through the connecting plate 532 adjacent the slots 552. As best shown in FIG. 17, the driving bars 582 extend through the elongated slots 583 and engage the driving protrusions 581.

A rearward end of the drive shaft 530 can include a tool engagement portion 538 configured to be received in a tool holder or chuck of a power tool. A forward end of the drive shaft 530 can include a drive portion 540 configured to slidingly support the connecting plate 532 and the locking member 534.

In the illustrated embodiment of FIGS. 17-18, the tool engagement portion 538 has a substantially hexagonal cross-sectional shapes and includes six flat sides. The drive portion 540 has a substantially circular cross-sectional shape and includes a pair of opposed truncated surfaces so that the cross-sectional shape is not fully circular. The locking member 534 has a central aperture 556 with a cross-sectional shape corresponding to the shape of the drive portion 540.

In the illustrated embodiment of FIGS. 17-18, the connecting plate 532 defines a central aperture 548 having a circular shape. When the cutting tool 510 is assembled, the connecting plate 532 can abut the flange 542 such that the drive portion 540 of the drive shaft 530 extends through the central aperture 548 and threaded fasteners (not shown) extend through the apertures (not shown) in the flange 544 and thread into the apertures (not shown) in the connecting plate 532 to secure the connecting plate 532 to the flange 544 of the drive shaft 530.

Figure 19:
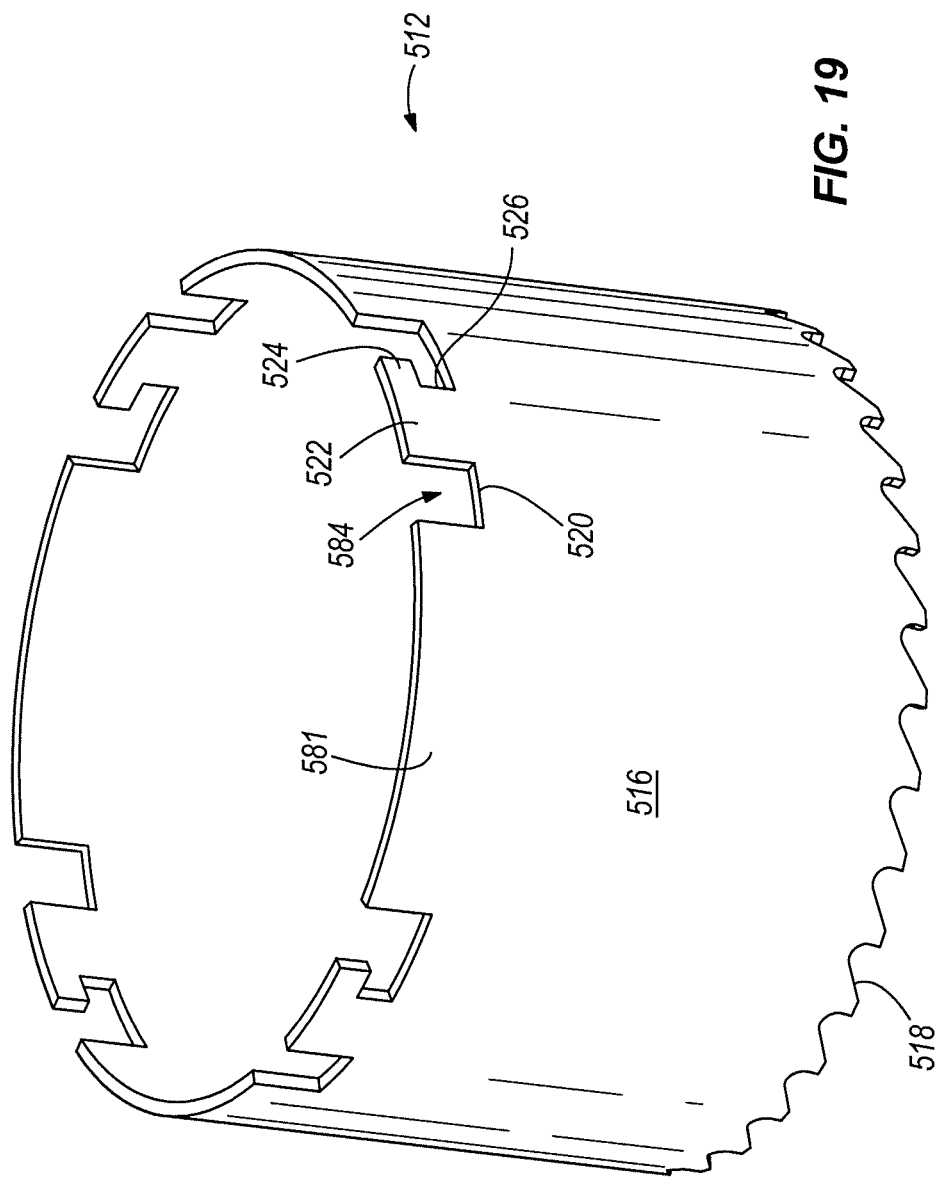
FIG. 19 is a front perspective view of a cutting body according to another embodiment of the present invention.
Figure 20:
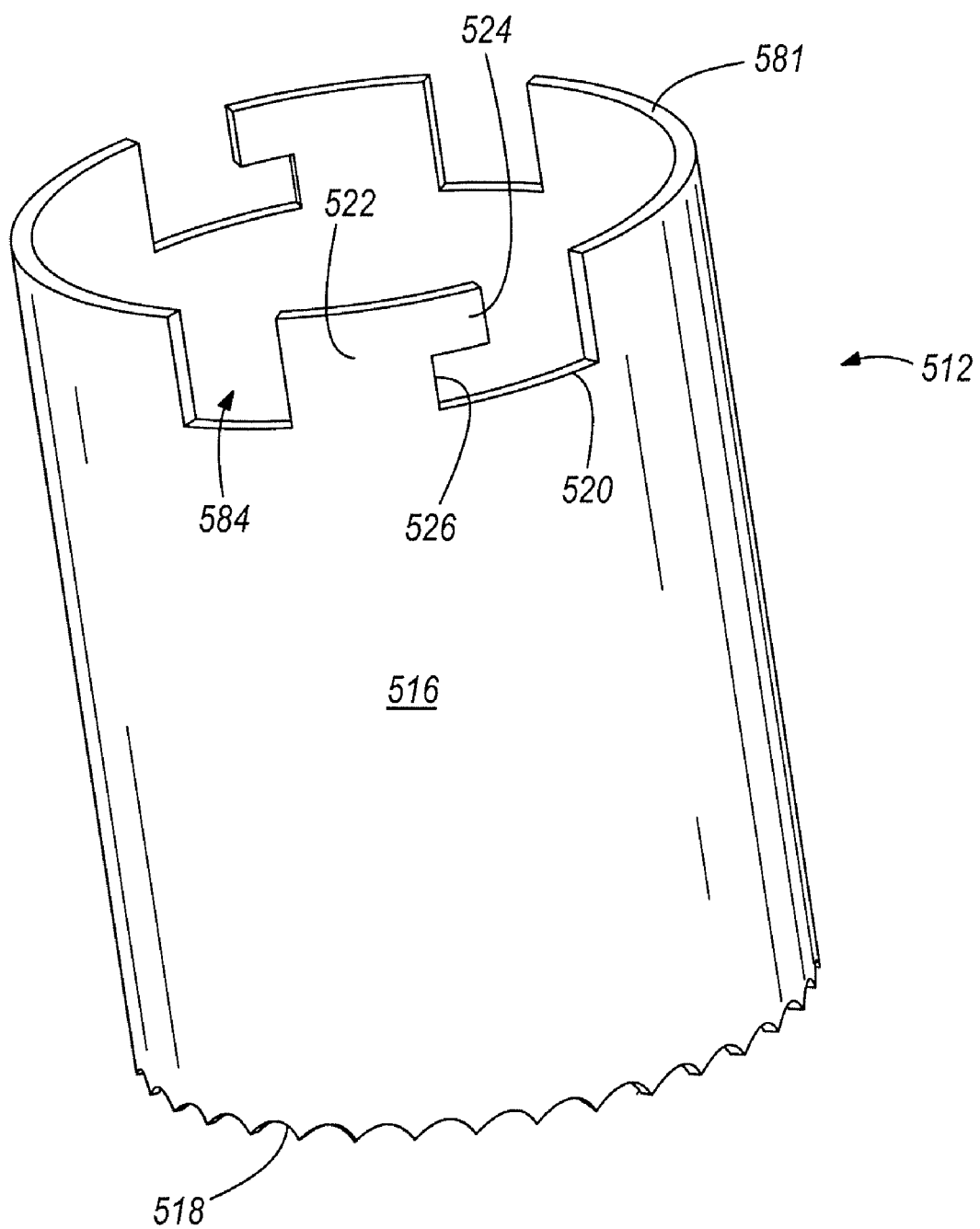
FIG. 20 is a front perspective view of a cutting body according to another embodiment of the present invention.

The connecting plate 532 can also include radially-spaced sets of slots 552 and webs 554 extending between the slots 552. Each set of slots 552 can be configured to receive a cutting body 512 having a specific diameter, and thus each set of slots 552 can be positioned at a radial distance from the approximate center of the connecting plate 532 (e.g., from the cutting axis 517). FIGS. 19 and 20 illustrate two cutting bodies 512 having differing diameters for being received in the slots 552. As illustrated in FIG. 18, multiple differently-sized cutting bodies can be secured to the connecting plate 532 at the same time. In the illustrated embodiment, each set includes four slots 552 that are configured to receive the four locking protrusions 522 extending outwardly from the body 512. In other embodiments where the cutting body 512 includes more or less than four locking protrusions 522, each set of slots 552 in the connecting plate 532 can include more or less slots 552 as appropriate.

The cutting body 512 can be connected to the connecting plate 532 by inserting the locking protrusions 522 into an appropriate set of slots 552 until the driving protrusions 581 abut the bottom surface of the connecting plate 532. The cutting body 512 can then be rotated about the cutting axis 517 and relative to the connecting plate 532 such that the locking tabs 524 extend into the slots 552. The locking member 534 can be engaged with an upper surface of the connecting plate 532 so that the driving bars 582 extend into the elongated slots 583. The driving bars 582 are received in gaps 584 between the locking protrusions 522 and the driving protrusions 581 and prevent the locking protrusions from rotating out of the slots 552.

In operation, an operator can select a cutting body 512 of a desired size and can connect the cutting body 512 to the connecting structure 514. To connect a cutting body 512 to the connecting structure 514, the operator grips a gripping portion 566 of the locking member 534 and moves the locking member 534 rearwardly along the drive shaft 530 from a locked position toward an unlocked position, compressing a biasing member (not shown) against a forward side of the locking flange 536.

The operator can then align the locking protrusions 522 of the cutting body 512 with the corresponding slots 552 in the connecting plate 532, move the locking protrusions 522 axially into the corresponding slots 552, and pivot the cutting body 512 about the cutting axis 517 in a circumferential direction such that the locking tabs 524 are moved across the webs 554 of the connecting plate 532 and such that the webs 554 engage the locking recesses 526 between the second end 520 of the cutting body 512 and the forward ends of the locking tabs 524. Thereafter, the operator can release the gripping portion 566 of the locking member 534 such that the bias member pushes the locking member 534 forwardly from the unlocked position toward the locked position and into engagement with the connecting plate 532. In doing so, the driving bars 582 are aligned with and protrude into the elongated slots 583. The driving bars 582 extend into the gaps 584 between the locking protrusions 522 and the driving protrusions 581. This secures the locking tabs 524 between the driving bars 582 and the webs 554.

The operator can then connect the tool engagement portion 538 of the drive shaft 530 to a power tool such that the power tool can rotate the cutting tool 510 about the cutting axis 517 to cut a hole in or work on a workpiece. Torque is transferred from the drive shaft 530 to the locking member 534. The driving bars 582 exert torque on the back-side of the locking protrusions 522 opposite the locking tabs 524 to effect rotation of the cutting body 512. If it is necessary to operate the power tool in reverse (so as to back the cutting body 512 out of a hole), the driving bars 582 exert torque on the driving protrusions 581.

The embodiments described above and illustrated in the figures are presented by way of example only and are not intended as a limitation upon the concepts and principles of the present invention.

The invention claimed is:

1. A hole cutting saw comprising:
   a cutting body having a generally cylindrical side wall defining a cutting axis;
   a connecting structure configured to support the cutting body; and
   a locking arrangement for selectively coupling the cutting body to the connecting structure, wherein the locking arrangement includes locking protrusions extending from the cylindrical side wall of the cutting body in a direction generally parallel to the cutting axis for selectively engaging correspondingly shaped slots on the connecting structure,
   wherein the connecting structure includes radially-spaced sets of the slots and webs extending between the slots, wherein each set of the slots is sized to receive one of a plurality of differently sized cutting bodies, and
   further wherein the sets of slots are circumferentially offset from one another.

2. The hole cutting saw of claim 1, wherein the locking protrusions are curved to at least partially correspond to a curvature of the side wall.

3. The hole cutting saw of claim 1, wherein the locking protrusions include outwardly extending locking tabs.

4. The hole cutting saw of claim 1, wherein the locking protrusions are spaced around a circumference of the cutting body at substantially regular intervals to define similarly sized gaps between adjacent protrusions.

5. A hole cutting saw comprising:
   a connecting structure;
   a sleeve supported on an end of the connecting structure; and
   a first and a second hole cutting body supported on an end of the sleeve opposite the connecting structure, the first and second hole cutting bodies defining a cutting axis and being movably coupled to the sleeve so as to be maintained in a first orientation in which ends of the first hole cutting body are engaged with ends of the second hole cutting body and movable to a second orientation in which the ends of the first hole cutting body are spaced apart from the ends of the second hole cutting body.

6. The hole cutting saw of claim 5, wherein the hole cutting bodies are threaded onto the end of the sleeve.

7. The hole cutting saw of claim 5, further comprising inter-engaging elements on the hole cutting bodies and the sleeve for securing the first and second hole cutting bodies to the sleeve.

8. The hole cutting saw of claim 5, further comprising ramped surfaces on the first and second hole cutting bodies for cammingly engaging an outer surface of the sleeve.

9. The hole cutting saw of claim 5, further comprising a locking arrangement for selectively coupling the sleeve to the connecting structure, the locking arrangement including locking protrusions extending from one of the sleeve and the connecting structure in a direction generally parallel to the cutting axis for selectively engaging correspondingly shaped slots on the other of the sleeve and the connecting structure.

10. The hole cutting saw of claim 5, further comprising a plug ejecting assembly including a plug ejecting element supported on the connecting structure for axial movement between a recessed position in which the ejecting element is prevented from extending into the hole cutting body and an extending position in which the ejecting element extends forwardly from the connecting structure into an interior of the hole cutting body.

11. The hole cutting saw of claim 10, further comprising biasing elements for biasing the ejecting elements towards the recessed position.

12. The hole cutting saw of claim 10, wherein the plug ejecting assembly includes two plug ejecting elements.

13. A method of operating a hole cutting saw, the method comprising:
providing a hole cutting saw having a first cutting body and a second cutting body, and a connecting structure configured to support the first and second cutting bodies;
removably securing the first and second cutting bodies to the connecting structure; and
cutting a workpiece with the cutting bodies;
wherein the first cutting body and the second cutting body are maintained in a first orientation while cutting the workpiece, the first orientation being that ends of the first cutting body engage ends of the second cutting body, and moving the first cutting body and the second cutting body relative to the connecting structure to a second orientation after cutting the workpiece, the second orientation being that a gap is formed between the ends of the first cutting body and the second cutting body.

14. The method of claim 13, further comprising:
supporting a plug ejecting element on the connecting structure; and
moving the plug ejecting element axially relative to the connecting structure from a recessed position in which the ejecting element is prevented from extending into the first cutting body to an extended position in which the plug ejecting element extends forwardly from the connecting structure into an interior of the first cutting body, thereby ejecting a plug from the cutting bodies.

15. A hole cutting saw comprising:
a cutting body having a generally cylindrical side wall defining a cutting axis;
a connecting structure configured to support the cutting body; and
a locking arrangement for selectively coupling the cutting body to the connecting structure, wherein the locking arrangement includes locking protrusions extending from the cylindrical side wall of the cutting body in a direction generally parallel to the cutting axis for selectively engaging correspondingly shaped slots on the connecting structure,
wherein the connecting structure includes a drive shaft, a connecting plate secured to the drive shaft, the connecting plate having the slots formed therein, a locking member and a detent arrangement for securing the locking member to the drive shaft.

16. The hole cutting saw of claim 15, wherein the locking protrusions are curved to at least partially correspond to a curvature of the side wall.

17. The hole cutting saw of claim 15, wherein the locking protrusions include outwardly extending locking tabs.

18. The hole cutting saw of claim 15, wherein the locking protrusions are spaced around a circumference of the cutting body at substantially regular intervals to define similarly sized gaps between adjacent protrusions.

* * * * *